United States Patent

Fushimoto et al.

[11] Patent Number: 5,742,505
[45] Date of Patent: Apr. 21, 1998

[54] ELECTRONIC TRANSLATOR WITH INSERTABLE LANGUAGE MEMORY CARDS

[75] Inventors: Hideo Fushimoto, Tokyo; Shinichi Matsumoto, Yokohama, both of Japan

[73] Assignee: Canon Kabushiki Kaisha, Tokyo, Japan

[21] Appl. No.: 257,427

[22] Filed: Jun. 8, 1994

Related U.S. Application Data

[63] Continuation of Ser. No. 640,165, Jan. 11, 1991, abandoned.

[30] Foreign Application Priority Data

| Jan. 18, 1990 | [JP] | Japan | 2-7245 |
| Jan. 18, 1990 | [JP] | Japan | 2-7246 |
| Jan. 18, 1990 | [JP] | Japan | 2-7247 |

[51] Int. Cl.⁶ ................................. G06F 17/20
[52] U.S. Cl. ............................... 364/419.01
[58] Field of Search ............ 364/419.02, 419.03, 364/419.14, 419.15, 419.16

[56] References Cited

U.S. PATENT DOCUMENTS

| 4,383,306 | 5/1983 | Morimoto et al. |
| 4,498,149 | 2/1985 | Yoshida . |
| 4,563,552 | 1/1986 | Fushimoto . |
| 4,600,257 | 7/1986 | Fushimoto . |
| 4,613,944 | 9/1986 | Hashimoto et al. ............... 364/513.5 |
| 4,644,492 | 2/1987 | Murata ........................... 364/DIG. 2 |
| 4,652,976 | 3/1987 | Fushimoto . |
| 4,718,044 | 1/1988 | Matsuyama ........................ 365/200 |
| 4,733,368 | 3/1988 | Morimoto et al. .............. 364/DIG. 2 |
| 4,791,608 | 12/1988 | Fushimoto . |
| 4,989,177 | 1/1991 | Morimoto et al. .............. 364/DIG. 2 |
| 5,150,294 | 9/1992 | Tateno .............................. 364/419 |

FOREIGN PATENT DOCUMENTS

| 0251477 | 1/1988 | European Pat. Off. . |
| 2468942 | 5/1981 | France . |
| 3112007 | 3/1981 | Germany . |

*Primary Examiner*—Gail O. Hayes
*Assistant Examiner*—Felicia Ives
*Attorney, Agent, or Firm*—Fitzpatrick, Cella, Harper & Scinto

[57] ABSTRACT

This invention discloses an electronic apparatus for processing language information of plural languages, on which an external memory device is detachably mounted, whereby specific character information stored in the memory device is displayed and desired character information therein can be selected and entered by a selector. A message is displayed at a predetermined timing of processing with an expression corresponding to the language information stored in the memory device. Control information stored in the memory device is utilized to display a function of language information processing activated, for example, at the start of power supply.

12 Claims, 21 Drawing Sheets

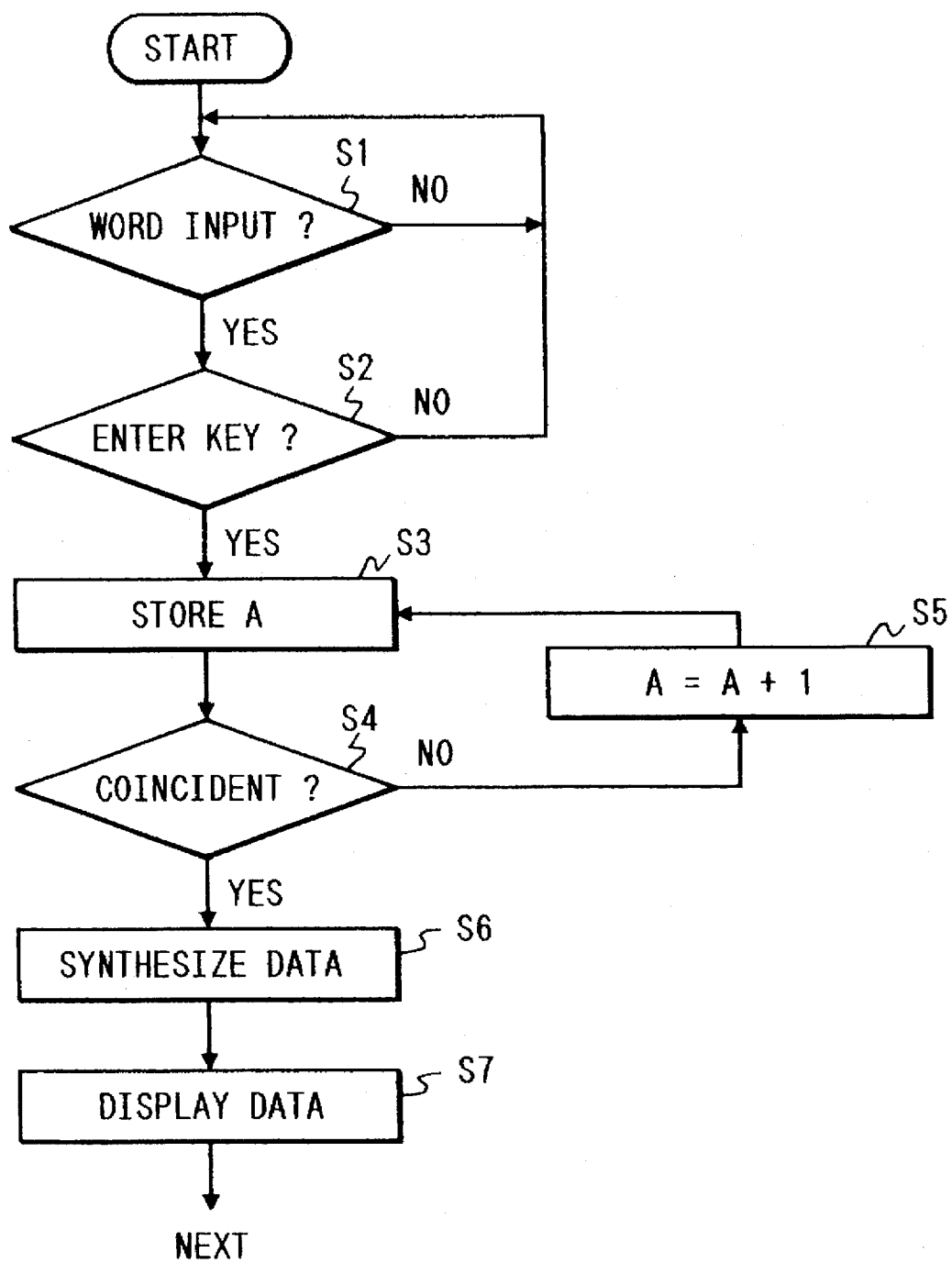

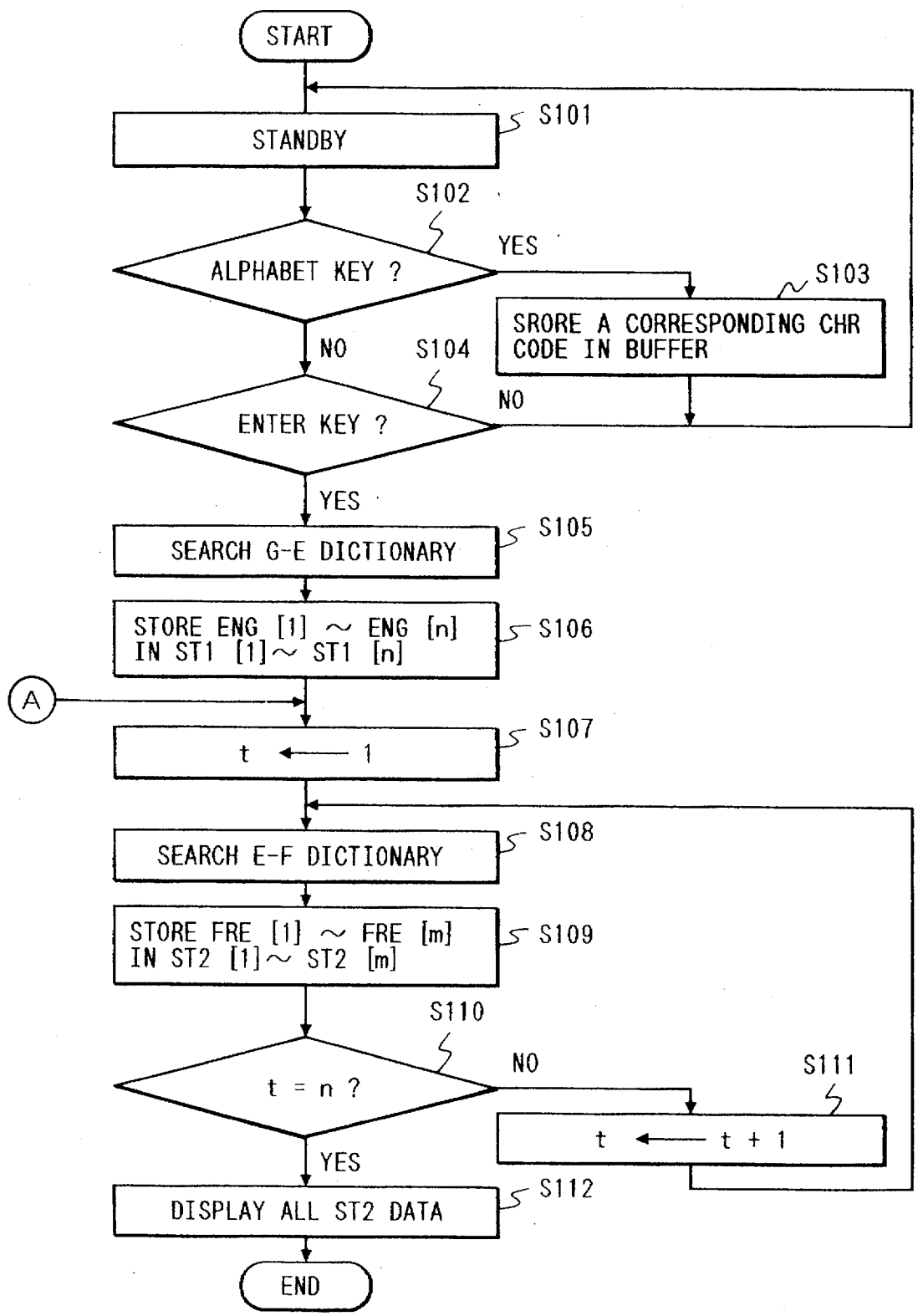

FIG. 6

| GERMAN 61 | ENGLISH 62 | FRENCH 63 |
|---|---|---|
| finden | find | trouver<br>estimer<br>déclarer<br>prononcer<br>pouvoir |
| | discover | découvrir<br>révéler<br>montrer |
| | think | penser<br>croire<br>imaginer<br>songer<br>trouver<br>juger<br>s'imaginer<br>s'aviser |
| | considér | considérer<br>examiner<br>estimer<br>réfléchir |

FIG. 8

| GERMAN ~81 | ENGLISH ~82 | FRENCH ~83 | ENGLISH ~84 |
|---|---|---|---|
| finden | find | <u>trouver</u> | <u>find</u><br>detect<br>deem<br>discover<br>judge |
|  |  | estimer | estimate<br>assess<br>deem<br>value<br>esteem |
|  | discover | <u>découvrir</u> | uncover<br>desclose<br>expose<br>detect<br><u>discover</u> |
|  |  | révéler | reveal<br>develop<br>disclose<br>betray |
|  |  |  |  |

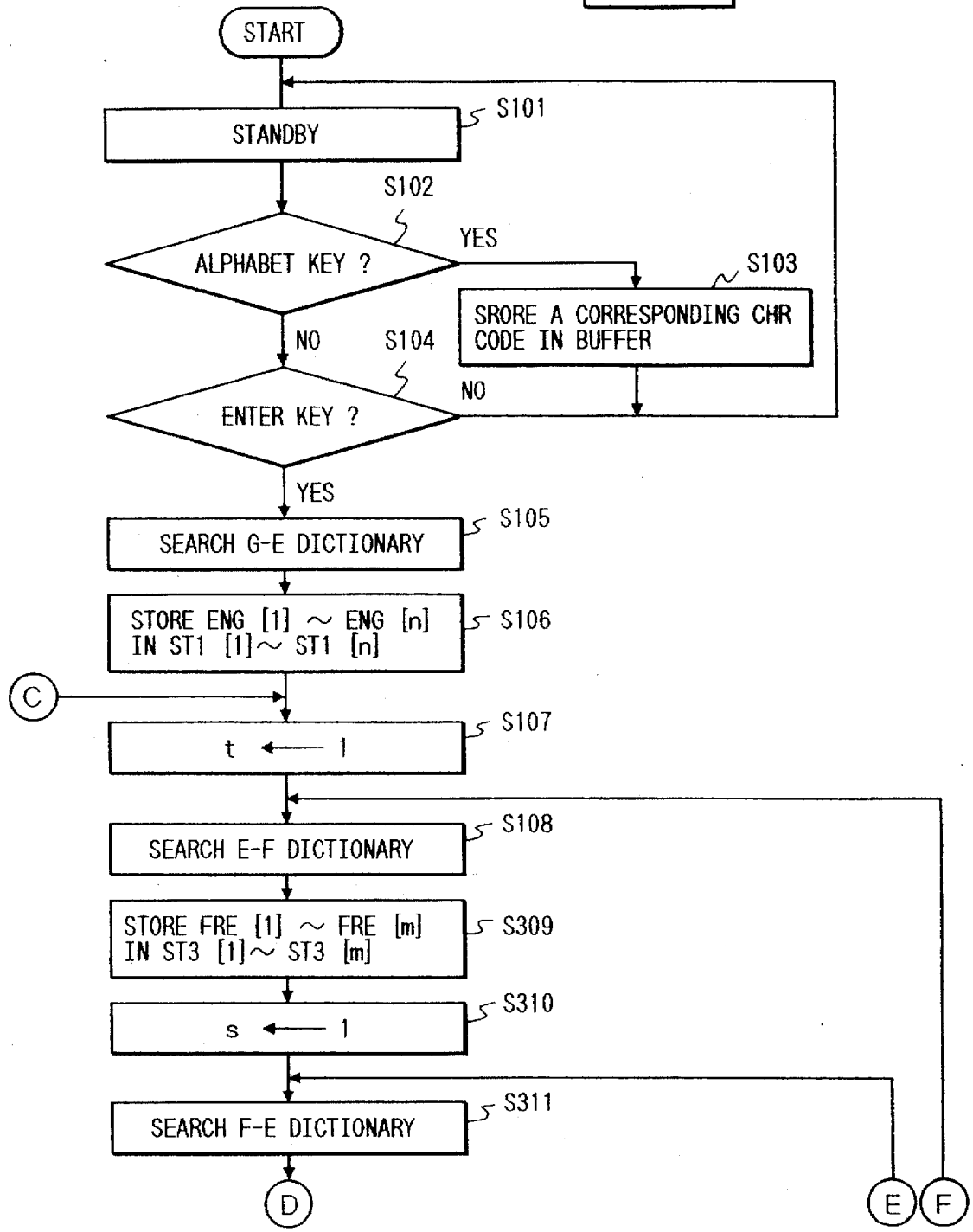

FIG. 10

| GERMAN | ENGLISH | FRENCH | ENGLISH | GERMAN |
|--------|---------|--------|---------|--------|
| <u>finden</u> | find | <u>trouver</u> | find | <u>finden</u><br>treffen<br>herausfinden<br>versorgen |
| | | | deem | halten<br>denken<br>urteilen |
| | discover | découvrir | uncover | aufdecken<br>freilegen<br>entblößen |
| | | | discover | entdecken<br>ausfindig machen |
| | | | | |

Columns labeled 101, 102, 103, 104, 105.

FIG. 12

| GERMAN | ENGLISH | GERMAN | FRENCH |
|---|---|---|---|
| finden | find | <u>finden</u><br>treffen<br>herausfinden<br>befinden | trouver<br>estimer<br>déclarer<br>prononcer<br>pouvoir |
| | discover | entdecken<br>ausfindig<br>machen | — |
| | think | denken<br>nachdenken<br>meinen<br>glauben | — |
| | consider | betrachten<br>erwägen<br>überlegen | — |

Columns labeled 121, 122, 126, 123.

|  | 1ST EMBODIMENT | 2ND EMBODIMENT | 3RD EMBODIMENT | 4TH EMBODIMENT |
|---|---|---|---|---|
| 5TH EMBODIMENT | ○ | ○ | | |
| 6TH EMBODIMENT | ○ | | ○ | |
| 7TH EMBODIMENT | ○ | | | ○ |
| 8TH EMBODIMENT | ○ | ○ | ○ | |
| 9TH EMBODIMENT | ○ | ○ | | ○ |
| 10TH EMBODIMENT | ○ | | ○ | ○ |
| 11TH EMBODIMENT | ○ | ○ | ○ | ○ |

ELECTRONIC TRANSLATOR WITH INSERTABLE LANGUAGE MEMORY CARDS

This application is a continuation of application Ser. No. 07/640,165 filed Jan. 11, 1991, now abandoned.

BACKGROUND OF THE INVENTION

1. Field of the Invention

The present invention relates to an electronic apparatus, and more particularly an electronic apparatus for effecting translation among plural languages based on dictionary data stored in a memory.

2. Related Background Art

There has already been known an electronic apparatus with a function of electronic dictionary or electronic translation. In such apparatus, in response to the entry of a word or a text in one language, for example English, there is displayed a word or a text translated in another language for example German.

The conversion of first language information into second language information is conducted by searching, by means of a microprocessor, a memory storing the first language and the second language in mutual correlation, with respect to the first language. The output is usually done by a display such as a liquid crystal display unit, but acoustic output by voice or printed output by a printer is also conceivable.

Also there have recently been proposed various appratus, in which external memory devices, or so-called IC cards, are detachably mountable for the purpose of expanding the functions of the main apparatus.

For example, in case of an electronic apparatus constructed as an English-English electronic dictionary, the simplest structure is to release, in response to the entry of an English word, several corresponding English words, and the conversion to other languages can be achieved by selectively mounting one of plural IC cards, constituting external memory devices, corresponding to different languages.

However, in order to obtain information of a desired language, the operator is required to effect a cumbersome operation of replacing the IC card with one corresponding to the desired language. Also, for achieving translation between other languages, it is necessary to store information relating to such other languages in advance in the main body, or to prepare plural IC cards respectively corresponding to the different combinations of languages. Use of many ROM's for the information storage leads to an elevated cost of the main body, and use of plural IC cards may cause confusion on the part of the operator.

Also, in case the operator is required to selectively mount one of plural IC cards each having different functions, there results drawbacks that the operator is unable to identify the functions achievable with the system of the main body and the IC card, or that the keyboard becomes very complex if the characters and symbols are provided therein for entering various languages, thereby not only rendering the input operations cumbersome but also enlarging the dimension of the keyboard and the main body itself, which significantly deteriorates the portability thereof.

Also, in a case where the main body constructed as an English-English dictionary is operated by a German person with an IC card for German language, the messages displayed on the main body, such as error messages, are usually given only in a language employed in the main body, namely in English in this case, so that such messages are difficult to understand for a German person and the procedure of operation may not be understood. It is therefore proposed to prepare such messages in plural languages in the main body and to allow the operator to select one of such languages, but such method increases the memory capacity of the main body, thereby elevating the cost thereof.

Though the convetionally known apparatus can accept only one IC card at a time, there can also be conceived a structure in which plural IC cards are mounted and the translation is conducted by the combination of dictionary data of these plural IC cards. However, in such structure, the above-mentioned drawbacks will become more complex and practically unsolvable.

SUMMARY OF THE INVENTION

The present invention is directed to resolving the above-mentioned drawbacks in an effective manner, particularly in an electronic apparatus capable of accepting a dictionary constructed as plural IC cards.

A first object of the present invention is to provide a structure allowing display, on display means, of the character information specific to the language information stored in an external memory device and, when desired character information is selected by selector means from the displayed character information, allowing entry of said selected character information into the apparatus, thereby enabling entry, by means of the selector means of the display means, of the character information specific to the language of the language information stored in the detachable external memory device.

A second object of the present invention is to provide a structure for displaying, when an external memory device is mounted, messages by the display means in a language corresponding to the language information stored in said external memory device at a predetermined timing, thereby providing adequate message displays automatically with the language of the language information stored in the detachable external memory device.

A third object of the present invention is to provide a structure for displaying, when an external memory device is mounted, language information processing functions activated by the control information stored in said external memory device, by means of the display means at a predetermined timing, thereby clarifying the language processing functions activated by the detachable external memory device through the display means.

BRIEF DESCRIPTION OF THE DRAWINGS

FIG. 3 is a flow chart of the basic sequence of a translation process;

FIG. 5 is a flow chart of the details of a first embodiment of the translation process;

FIG. 6 is a chart showing the result of a search according to the translation process shown in FIG. 5;

FIG. 8 is a chart showing the result of a search according to the translation process shown in FIG. 7;

FIGS. 9, 9A–9B are flow charts of the details of a third embodiment of the translation process;

FIG. 10 is a chart showing the result of a search according to the translation process shown in FIG. 9;

FIG. 12 is a chart showing the result of a search according to the translation process shown in FIG. 11;

DETAILED DESCRIPTION OF THE PREFERRED EMBODIMENTS

Now the present invention will be explained in greater detail by preferred embodiments thereof shown in the attached drawings. In the following there will be described, as said embodiments, an electronic dictionary which is usable as an English-English dictionary by the dictionary data stored in the main body, and which also can achieve translation among plural languages such as German to French, French to German, Japanese to French and French to Japanese, by mounting of plural dictionary cards constructed as IC cards.

[Hardware Structure]

Figure 1:
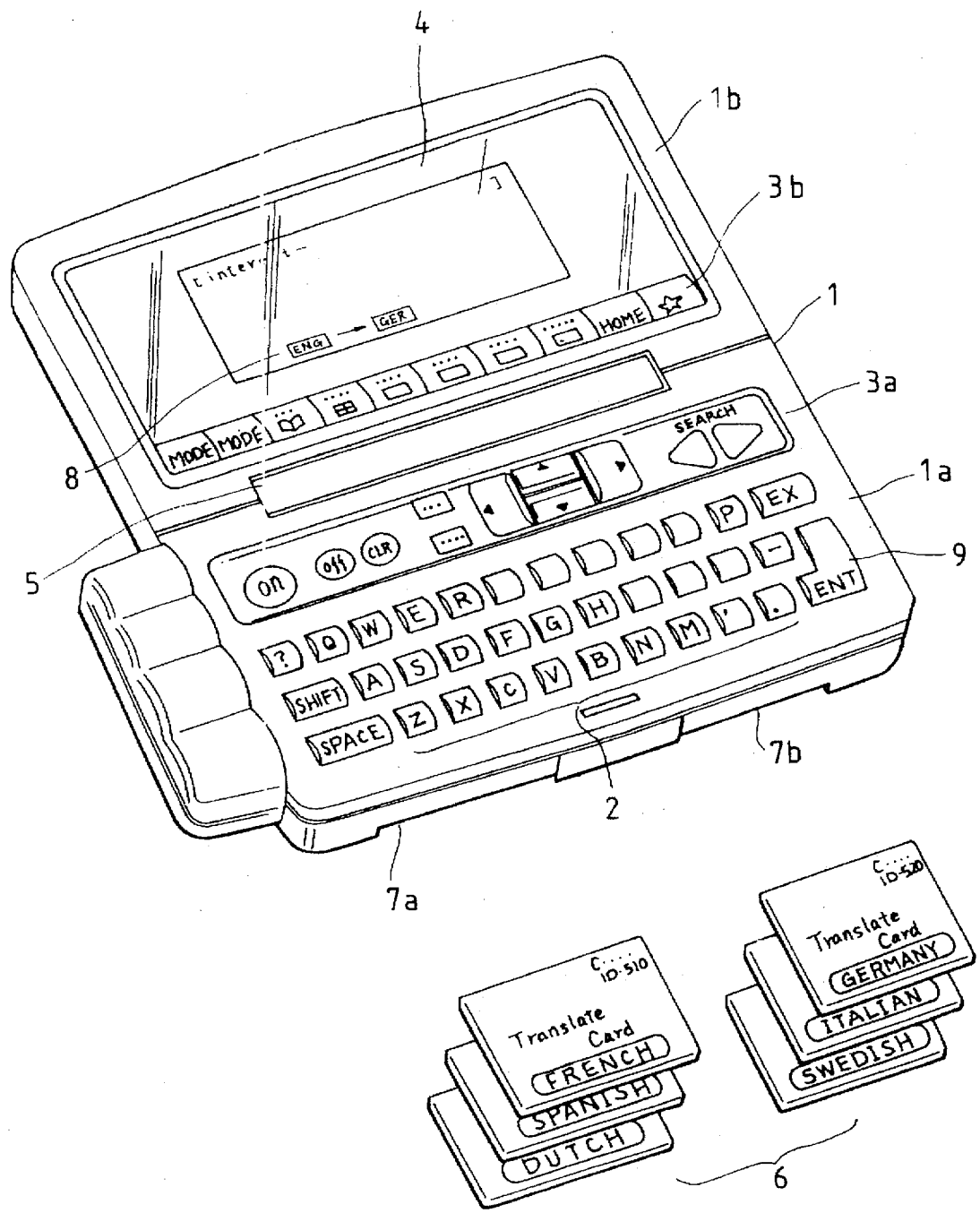
FIG. 1 is a perspective view of an electronic apparatus embodying the present invention.

FIG. 1 is an external view of the electronic dictionary embodying the present invention.

A main body 1 is composed of a case 1a having alphabet keys 2 for entering an index word and function keys 3a, and a case 1b having a display unit 4 and function keys 3b, said cases 1a and 1b being openably connected by a hinge 5.

Various IC cards 6 can be mounted in two card slots 7a, 7b provided at a lateral face of the case 1a.

On the surface of the display unit 4 there is provided a transparent keyboard 8 to be explained later. An enter key 9 is provided to enter an instruction for converting an entered word into another language.

[Structure of Control Unit]

Figure 2:
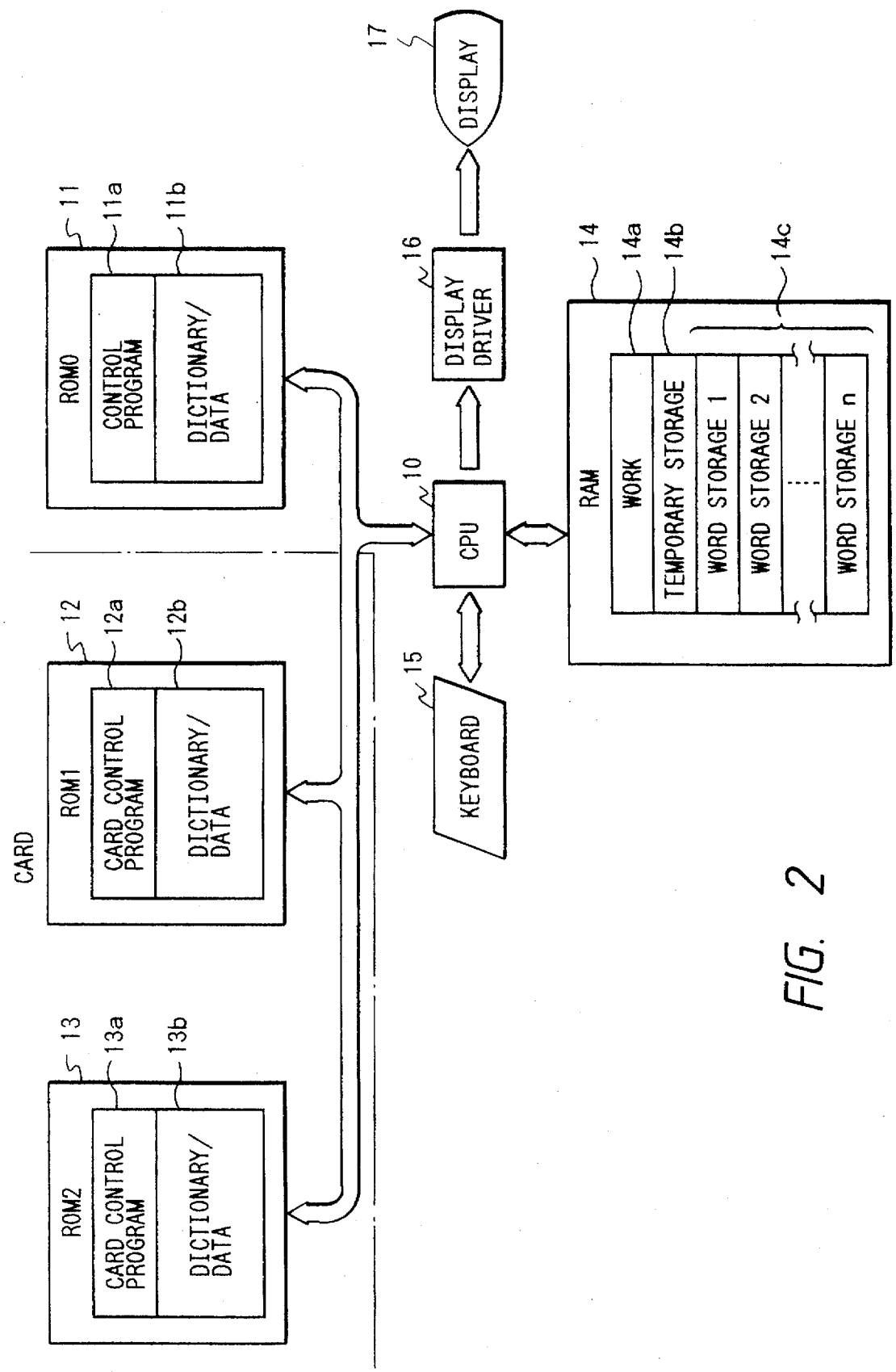
FIG. 2 is a block diagram of a control system of the apparatus shown in FIG. 1.

FIG. 2 is a block diagram of a control system of the apparatus shown in FIG. 1. There are provided a CPU 10 for controlling the entire apparatus, and a ROM(0) 11 for storing an error process program, a key input process program, a display process program, a dictionary search program to be explained later, an English-English dictionary and various message data. In ROM 11 there is provided a control program area 11a for storing various control programs.

A dictionary data area 11b stores English words and corresponding meanings, to be used as an English-English dictionary.

The present embodiment is so designed as to be capable of translation among plural languages such as German to French, French to German etc. in addition to the English-English dictionary.

Thus, numerals 12 and 13 respectively indicate a ROM(1) and a ROM(2) provided in two IC cards serving as external memory devices.

In said ROM's 12, 13 there are provided card control program areas 12a, 13a for executing card application control, and dictionary data areas 12b, 13b for storing dictionary data.

A RAM 14 contains a work area 14a for various control programs, a temporary storage area 14b for stacking, and a word storage area 14c to be used, as will be explained later, for storage in the conversion between different languages through an intermediate language.

There are also provided a keyboard unit 15 provided with the alphabet keys 2, functions 3a, 3b etc. shown in FIG. 1; and a display driver 16 for controlling the display on the display unit 17 according to the control by the CPU 10.

In the above-explained control system, the information (English word) entered from the keyboard unit 15 is used, through the CPU 10, for searching the dictionary data area 11b stored in the ROM 11.

The character information to be displayed on the display unit 17 is transferred to the work area 14a of the RAM 14, and, after refinement of the display format, the result of search is displayed on the display unit 17 through a display driver 16. The present apparatus is controlled by the CPU 10 according to the content of the control program area 11a of the ROM 11.

Data in the cards can be searched in a similar process. The dictionary search process alone is conducted according to the contents of the control program areas 12a, 13a of the ROM's 12, 13 while other processes are controlled by the CPU 10 according to the content of the control program area 11a in the ROM 11.

[Basic Structure for Dictionary Search]

In the following there will be explained a basic process for dictionary search with reference to a flow chart shown in FIG. 3. This process is applicable not only to the search of the dictionary data area 11b in the main body but also to the search of the ROM's 12, 13 in the IC cards. The process is suitably stored in the program areas 11a, 12a, 13a of the ROM's 11, 12, 13. In FIG. 3, however, English-English translation is used as an example.

In case of obtaining English translation for an English word, at first a desired English word is entered by the alphabet keys 2 in a step S1 in FIG. 3.

Then a step S2 discriminates whether the enter key 9 has been actuated. If the step S1 or S2 is negated, the above-explained sequence is repeated.

When an English word is entered and the enter key 9 is actuated, a loop of steps S3 to S5 releases words from the dictionary data area 11b of the ROM 11, in succession from the dictionary start address A, and a step S4 discriminates the coincidence with the entered word. In case of noncoincidence, a step S5 stepwise advances the readout address A of the dictionary data area 11b, and the sequence returns to the step S3.

When an index word the same as the entered word is found, the sequence proceeds to a step S6 for reading the English translated information consisting of plural words corresponding to said entered word from the dictionary data area 11b, and said information is rearranged according to the display format and is displayed in a step S7 on the display unit 4. The above-explained steps S1 to S7 are also commonly used in various conversions to be explained later.

In the following there will be given a detailed explanation on the functions of the present invention.

[Basic Structure of Translation Between Different Languages]

At first there will be explained the basic structure of the translation system of the present invention between first and second languages (different languages for example from German to English or from English to German).

Figure 4A:
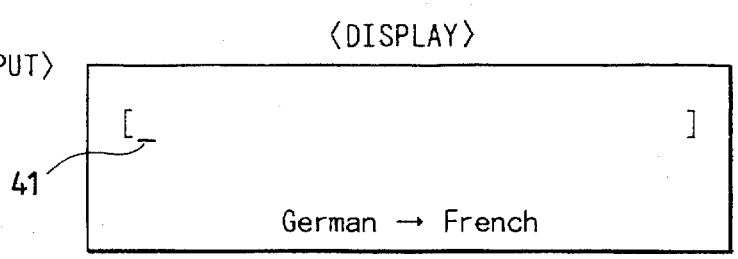
FIGS. 4A to 4C are views showing changes in basic displays in the translation process.
Figure 4B:
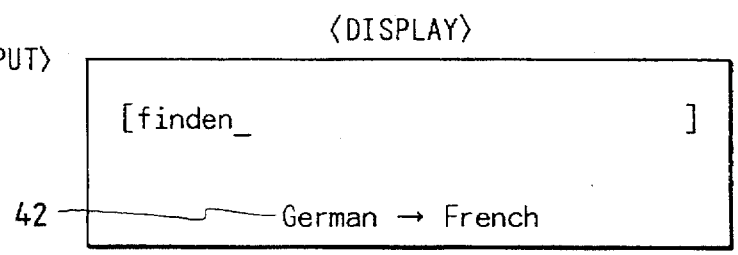
Figure 4C:
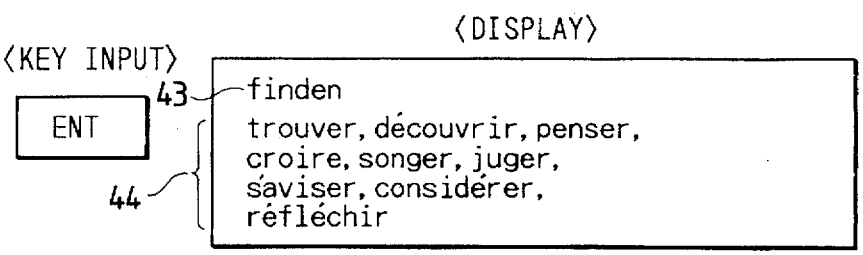

FIGS. 4A to 4C illustrate an example of key operations and displays in the translation process, in which German and French are taken as the first and second languages.

In FIG. 4A, a cursor 41 is displayed in a state for awaiting the entry of a German word.

In FIG. 4B, a German index word "finden" to be translated is entered. In the input waiting state, the first and second languages are always displayed, as indicated by a numeral 42. In response to the actuation of the enter key 9 after the input of the index word, there are displayed, as shown in FIG. 4C, the entered German index word 43 and plural translated French words 44.

[Details of Translation Between Different Languages]

In the present embodiment, in order to achieve translation between the first and second languages with an optimum memory efficiency, there is employed a method of utilizing a third intermediate language, as will be explained in the following examples.

For example an English-English dictionary is available in the memory of the main body and a German-English/English-German bidirectional dictionary and a French-English/English-French bidirectional dictionary are available in the IC cards. This method enables not only the translation by each of the dictionaries but also the translation from German to French or from French to German by the combination of these dictionary data.

In this embodiment, German, French and English are respectively selected as the first and second languages and the third intermediate language, among which there are provided:

first—third language bidirectional dictionary; and
second—third language bidirectional dictionary; namely a German-English/English-German bidirectional dictionary and a French-English/English-French bidirectional dictionary. These two bidirectional dictionaries are formed as IC cards incorporating the ROM's 12, 13 and attachable to the main body, and will be hereinafter called "German-English dictionary" or "English-German dictionary" etc.

Also the control sequence to be explained in the following is suitably stored in the control program areas of the ROM's 11, 12, 13.

Also in the following description, various work areas defined in the RAM 14 are represented for example by ST1[ ], ST2[ ], Eng[ ] etc., wherein X[n] corresponds to a program presentation in the C language etc., and indicates, in a character train with a start address X, an n-th component (character train itself). X[ ] may indicate a pointer positioning to a character train, but, in the flow chart, X[n] indicates the character train itself.

(First Embodiment of Translation Process)

Now a first embodiment of the translation process will be explained with reference to a flow chart shown in FIG. 5.

In FIG. 5, a step S101 is a standby state for the entry of a German index word by the user. When a key is depressed, a step S102 discriminates whether the key is an alphabet key effective for a German index word, and, if effective, a step S103 finds and stores a character code corresponding to the actuated key in a buffer, and the sequence returns again to the standby state.

If a step S104 identifies the depression of the enter key 9, a step S105 searches a German index word, corresponding to the group of character codes stored in the index buffer, from the German-English dictionary, and a step S106 stores plural English words Eng[1]–Eng[n], obtained as the result of translation corresponding to said German index word, in first buffers ST1[1]–ST1[n].

Then a step S107 sets a counter t at "1", for successively processing the words Eng[1]–Eng[n] stored in the step S106. Subsequently a step S108 searches the English-French dictionary for the content Eng[t] of the buffer ST1[t], and a step S109 stores plural French words Fre[1]–Fre[m], obtained by the translation, in second buffers ST2[1]–ST2[m]. Then steps S110, S111 continue a loop process until the steps S108 and S109 are executed on all the contents Eng[1]–Eng[n] of the first buffers ST1. When the step S110 identifies t=n, indicating that the process is completed for the last Eng[t], a step S112 displays the contents of the second buffers ST2, namely all the English-French translation results ST2[1]–ST2[n] corresponding to all the German-English translation results Eng[1]–Eng[n], on the display unit 17.

FIG. 6 shows results of translations for a German index word "finden".

The left column 61 shows the German index word searched from the input data, while the middle column 62 shows the results of German-English translation stored in the buffers ST1 by the step S106 in FIG. 5, and the right column 63 shows the results of English-French translation stored in the buffers ST2 respectively corresponding to each result of German-English translation, obtained by the step S109. Thus all the words in the right column 63 are displayed on the display unit 17.

As explained in the foregoing, translated words of a larger number or a wider sense than in the conventional translating method can be obtained with detachable plural (two in this case) bidirectional dictionaries.

However, though this method has an advantage of providing a larger number of translated words, it may be providing too many words and forcing the user to make a selection based on too many words. In the following second and third embodiments, there will be desclosed structures for confining the words obtained in the first embodiment efficiently to appropriate translated words.

(Second Embodiment of Translation Process)

Now there will be explained a second embodiment of the translation process, with reference to a flow chart shown in FIG. 7, wherein the steps S101 to S108 are same as those in the first embodiment.

A step S209 further searches the French-English dictionary for each French translated word searched in the step S108 and stores the results in buffers ST3.

Then a step S210 compares the English words stored in the buffers ST3 with the word Eng[t] stored in the buffer ST1[t]. If a step S211 finds a coinciding word, a step S212 stores the French word, obtained by translation of Eng[t], in the buffer ST2. In the absence of coinciding word, a step S214 stepwise increases the count of the counter t until a step S213 identifies t=n, thereby executing the steps S108 to S210 on all the words Eng[1]–Eng[n].

Finally, a step S215 displays all the contents of the buffers ST2, stored in the step S212, on the display unit 17.

FIG. 8 shows thus processed results of translation, for a German input word "finden" as in the first embodiment.

In FIG. 8, numerals 81 to 83 are same as 61 to 63 in FIG. 6. In the present embodiment, the French words in the column 83 are further translated into English words as shown in a column 84, and, if the results of said translation include an English word same as the word of the intermediate English language, the original French word in the column 83 of said French-English translation is included as a result of the German-French translation.

More specifically, a French word "trouver" in the column 83 is stored in the buffer ST2 because its translated English words include a word "find" identical with the word "find" in the column 82. On the other hand, a French word "estimer" in the column 83 is not stored in the buffer ST2 because its translated English words do not include the word "find". Similarly a word "découvrir" is stored but a word "révéler" is not stored.

Figure 7:
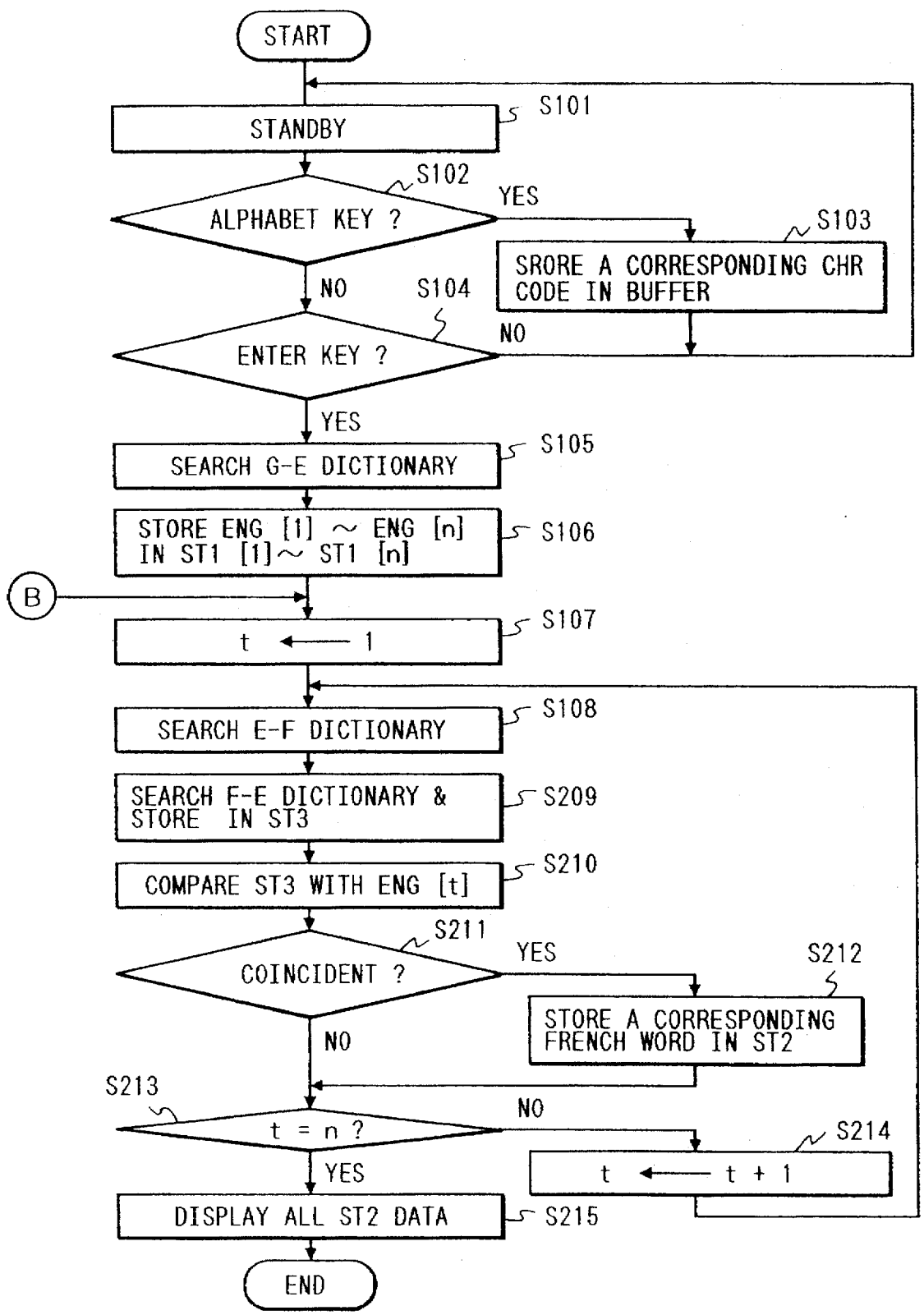
FIG. 7 is a flow chart of the details of a second embodiment of the translation process.

Thus, in a step S215 in FIG. 7, only the underlined French words in FIG. 8 are displayed on the display unit 17.

The above-explained structure allows the release of only the words having appropriate meaning, in case too many words are obtained in the first embodiment of the translation process.

(Third Embodiment of Translation Process)

Figure 9B:
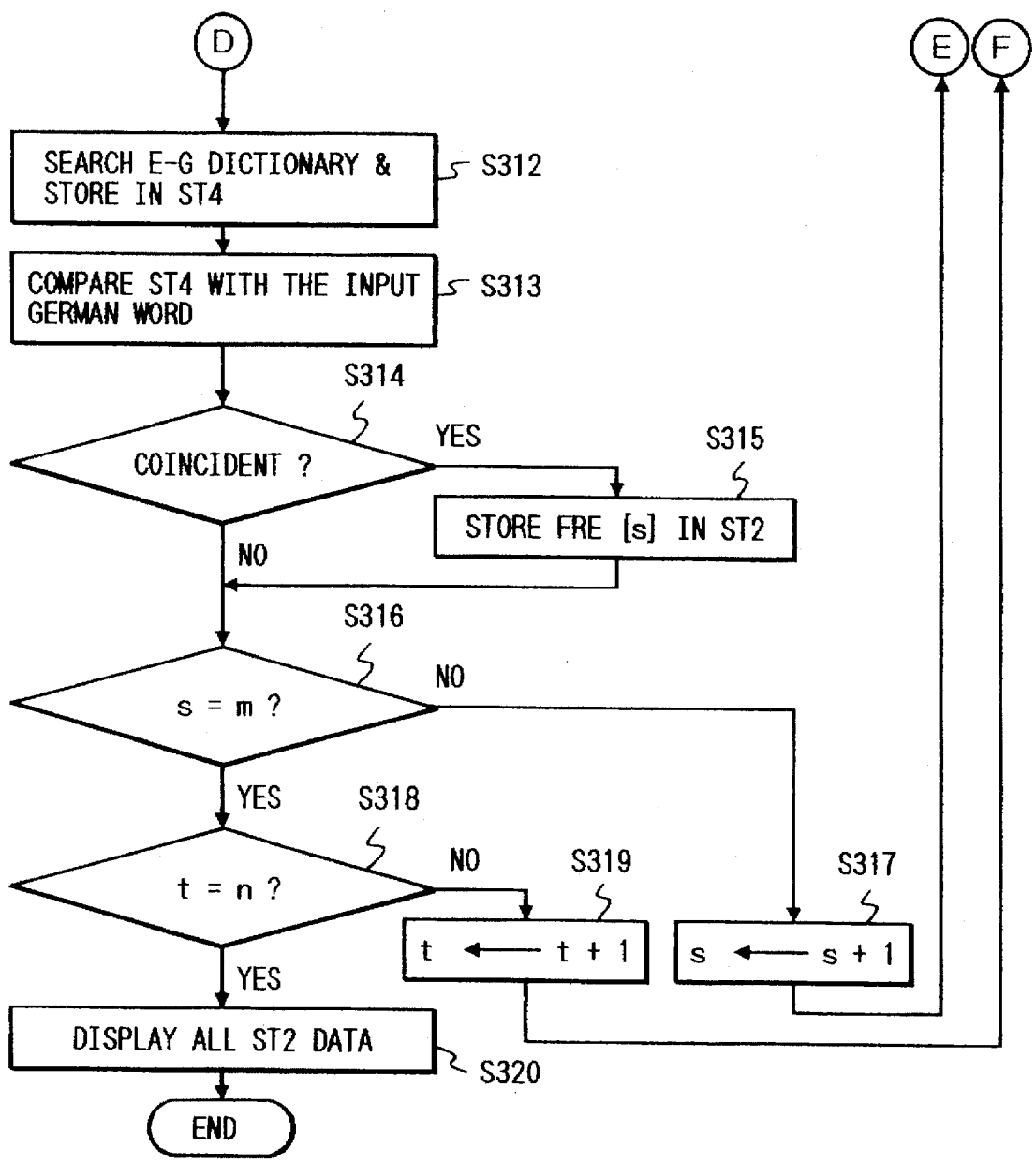

In the following there will be explained a third embodiment of the translation process, with reference to FIG. 9 showing, as in the second embodiment, an example of control for selecting appropriate ones from all the French words of the 2nd language obtained from the 1st German language through the intermediate English language.

In FIG. 9, the steps S101 to S108 are same as those in the first and second embodiments.

A step S309 stores French words Fre[1]–Fre[m], translated by the search in the step S108, into buffers ST3[1]–ST3[m].

Then, in order to process the words Fre[1]–Fre[m] stored in the step S309 in succession, a step S310 sets a counter s at "1". Subsequently a step S311 makes a search on the word Fre[s] in the buffer ST3 in the French-English dictionary, and a step S312 makes a search in the English-German dictionary and stores German words, obtained by the translation, into buffers ST4.

Then a step S313 compares the group of German words stored in the buffers ST4 with the initially entered German index word, and, if a step S314 finds a coinciding word, a step S315 stores the French word Fre[s], obtained by translation from the English word Eng[t], in buffers ST2.

In the absence of the coinciding word in the step S314, steps S316, S317 stepwise increases the count of the counter s until similar process is applied to all the French words obtained from the English word Eng[t]. When all the processes are completed for a value of t, steps S318, S319 stepwise increases the count of the counter t until same process is applied to all the results of English-German translation stored in the step S106. When a condition t=n, indicating the completion of all the processes, is reached, a step S320 displays all the contents of the buffers ST2 on the display unit 17.

FIG. 10 shows an example of translation of the third embodiment, in case of an input German word "finden", wherein numerals 101–104 correspond to 81–84 in FIG. 8.

In this embodiment, each English word in the column 104, as obtained in FIG. 8, is further translated into German words in the column 105, and decision on the results of translation in the column 103 is made by the comparison of the German words in the column 105 with the initial word in the column 101.

For example an English word "find", translated from a French word "trouver" in the column 103 is further English-German translated to obtain the German words shown in the column 105, including a German word "finden" identical with the initial index word, so that the French word "trouver" is stored in the buffer ST2. On the other hand, a French word "découvrir" is not stored because the German words in the column 105 translated from the English word "uncover" in the column 104 or those translated from the English word "discover" in the column 104 do not include the initial German index word "finden".

Thus a step S320 in FIG. 9 displays only the underlined words in the column 103 in FIG. 10 on the display unit 17.

(Fourth Embodiment of Translation Process)

Figure 11:
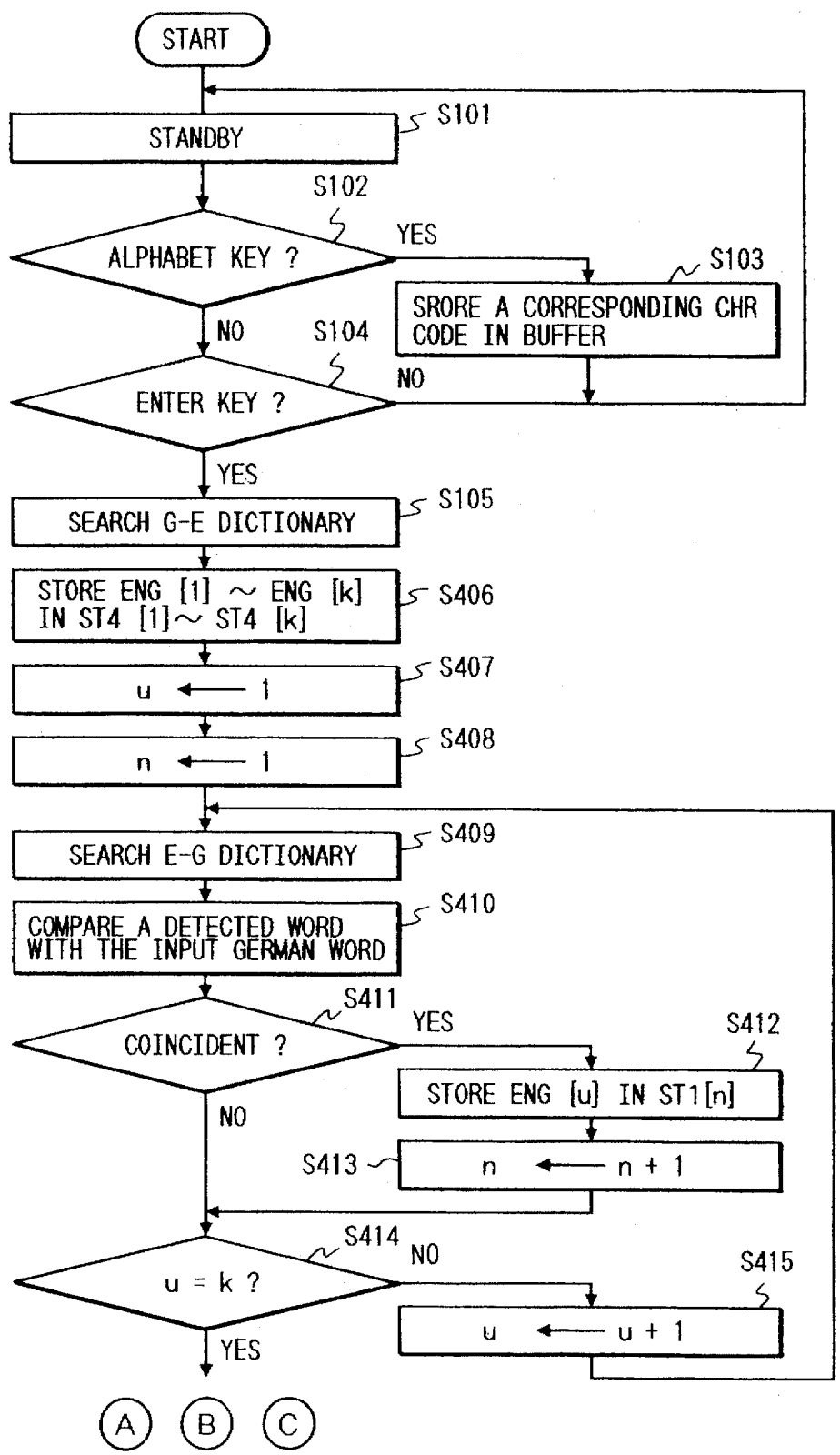
FIG. 11 is a flow chart of the details of a fourth embodiment of the translation process.

In the following there will be explained a fourth embodiment of the translation process, with reference to a flow chart shown in FIG. 11, showing an example of control, as in the 2nd embodiment, for selecting appropriate ones from the French words of the second language, obtained from the first German language through the intermediate English language.

In FIG. 11, the steps S101 to S105 are same as those in the first embodiment.

A step S406 stores English words Eng[1]–Eng[k], obtained by translation from the entered German index word, into buffers ST4[1]–ST4[k].

Then a step S407 sets a counter u, for processing in succession the words Eng[1]–Eng[k] stored in the step S406, at "1", and also sets a counter n, for successively storing the English words selected in said processing, at "1".

Then a step S409 makes a search in the English-German dictionary for the English word Eng[u] stored in the step S406; a step S410 compares thus translated German words with the initial German index word; then if a step S411 finds a same word, a step S412 stores the English word Eng[u] in the buffer ST1[n]; and a step S413 stepwise increases the count of the counter n.

In case of absence of the same word in the step S411, steps S414, S415 stepwise increase the count of the counter u until a condition u=k is reached, namely until similar translation and comparison are applied to all the English words Eng[u].

The subsequent process proceeds to a node [A] in the first embodiment shown in FIG. 5, a node [B] in the second embodiment shown in FIG. 7, or a node [C] in the third embodiment shown in FIG. 9.

The process prior to the node [A], [B] or [C] in the first, second or third embodiment is, as shown in columns 121, 122 and 123 in FIG. 12, to obtain English words from the initial German word, then to translate each of these English words into German words and to determine the English words for which the initial German word is obtained in the translation. Stated differently, the procedure shown in FIG. 11 is applicable to determine the intermediate 2nd language to be used in the translation from the first language to the third language.

Appropriate translated words can be selected in an easier and quicker manner by processing the thus determined 2nd language with the node [A], [B] or [C]. In the first to third embodiments, the translations of two or more steps starting from the intermediate language provides an enormous number of words, but a more efficient search is rendered possible in the fourth embodiment by limiting the number of candidate words in the stage of the intermediate language.

FIG. 12 compares the results of translation in the present fourth embodiment and in the first embodiment, for example for a German input word "finden", wherein columns 121–123 are same as columns 61–63 in FIG. 6.

A column 126 indicates the results of English-German translation on the English words obtained from the German input word.

Since the German words translated from the English word "find" in the column 122 include "finden" which is same as the initial German index word, the process is continued further to store "find" in the buffer ST1.

In the column 122, the English words "discover", "think" and "consider" are not stored in the buffer ST1 because the corresponding translated German words do not include "finden". Consequently, as the result of German-French translation, there are displayed the French words in the column 123 corresponding to the English word "find" in the column 122.

(Other Embodiments of Translation Process)

As explained in the foregoing, the process of the second, third or fourth embodiment allows improvement of the accuracy of the translation process conducted through an intermediate language as explained in the first embodiment. It is therefore possible to further improve the accuracy of translation by combining plural processes of the second to fourth embodiments.

Figures 13, 14:
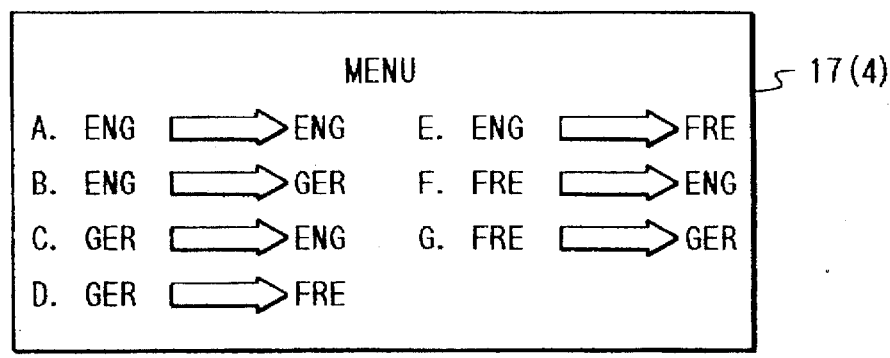
FIG. 13 is a table showing the structure of 5th to 11th embodiments obtained by combinations of the translations processes in the 1st to 4th embodiments.
FIG. 14 is a view showing an example of display in a first user interface system of the present invention.

FIG. 13 shows examples of such combination, wherein 5th to 11th embodiments shown in the left end column are attained by the combinations of the first to fourth embodiments shown in the top row. The seventh embodiment is achieved by the combination of the fourth and first embodiments, as explained at the end of the description of the fourth embodiment.

The combinations further increase by taking AND or OR conditions for each component in each combination, and the optimum result of translation can be obtained by suitably varying the combinations according to the condition of translation.

In the explanation of the foregoing first to eleventh embodiments, German, French and English are assumed as first, second and third languages respectively, but same principle is naturally applicable to any language such as Spanish or Italian, as long as there are available a bidirectional dictionary between the first and third languages and another bidirectional dictionary between the second and third languages. Also in the first to fourth embodiments there has been explained translation from German to French, but translation in the opposite direction is naturally possible with a same procedure.

Each of the bidirectional dictionaries stored in the ROM's 12, 13 of the IC card may naturally be used singly. More specifically, in the foregoing embodiments, each of the German-English/English-German bidirectional dictionary and the English-French/French-English bidirectional dictionary may naturally be used singly.

Various translation modes in the 1st to eleventh embodiments shown in FIG. 13 are advantageously rendered selectable through a keyboard. It is also conceivable to display the results of translation in plural translation modes corresponding to each embodiment, in time-sharing basis on the display unit 17 or in spatially divided areas in the display unit 17.

[Structure of User Interface: No. 1]

In the following there will be given a detailed explanation on the useful input-output control of the entire system consisting of the main body and the IC cards respectively storing different language information, namely on the user interface system.

(Twelfth Embodiment)

In the following there will be shown, as an example, a structure in which the main body capable of functioning as an English-English dictionary, shown in FIG. 1, is coupled with a first IC card containing a German-English/English-German bidirectional dictionary and with a second IC card containing a French-English/English-French bidirectional dictionary.

The above-mentioned system contains an English-English dictionary in the ROM 11 of the main body and three dictionaries of English, German and French constructed as IC cards, and these dictionaries can be combined in $_3P_2=6$ ways (German-French or French-German translation can be conducted in the foregoing 1st to 11th embodiments). Consequently there are 7 combinations in total, including the English-English translating function of the main body.

FIG. 14 shows a n example of the display on the display unit 17 in the present embodiment. As an item of the menu, there are displayed an alphabetical character, for example "E", and a translating function from a language to another, such as "ENG→FRE".

The operator can arbitrarily select any dictionary function. When a power switch of the main body is turned on, there is automatically given a display as shown in FIG. 14, and, if the operator wishes the French-German dictionary, he depresses the key "G" to select said dictionary function. In response there is given a display for awaiting the entry of a French word (not shown) on the display unit 17, and the translation process through the intermediate language is initiated.

If an Italian-English/English-Italian dictionary is mounted as the second IC card instead of the French-English/English-French dictionary, the words "FRE" are replaced by "ITA" in the display shown in FIG. 14 and the menu is similarly displayed for selecting one of 7 dictionaries.

In the following there will be explained the control sequence in the above-explained interface control, with reference to a flow chart shown in FIG. 15. This control sequence is stored in the control program area 11a of the ROM 11.

At first a step S501 discriminates the depression of an "on" key, for initiating the power supply in the main body, of the function keys 3a. When the key is depressed, a step S502 confirms the presence of an IC card in the first IC card slot. This confirmation can be achieved, for example, by forming a closed loop circuit when the IC card is mounted, sending a signal to the loop circuit and detecting a response signal therefrom.

Then a step S503 fetches an IC card classification code A stored in advance in the first IC card, and a step S504 discriminates whether said classification code A indicates a bidirectional translation function for the intermediate English language. If not, the system proceeds to another process, for example a control process functioning only on said IC card. If the step S504 identifies the bidirectional translation function, a step S505 stores the classification code A in the work area 14a of the RAM 14 of the main body.

Then a step S506 confirms the presence of an IC card in the second IC card slot. If an IC card is present, a step S507 fetches the card classification code B and a step S508 discriminates whether the code B indicates a translation function. If not, the system proceeds to another process as in the step S504. If the translation function is identified, a step S509 combines the classification codes A and B to obtain a pattern M, which is restored in the work area 14a.

Then a step S510 searches combination information corresponding to said pattern M in a table stored in advance in the ROM 11, and if said information is present, a step S511 reads said combination information together with character display information. Subsequently a step S512 synthesizes information in the RAM 14 and the display driver 16, a step S513 displays seven combination patterns on the display unit 17 as shown in FIG. 14, and a step S514 awaits the selection of a combination by alphabet keys.

If the step S506 does not confirm the presence of the IC card in the second IC card slot, a step S515 re-stores the aforementioned code A as the pattern M. Then the same process is executed after the step S510 to display combination patterns [A], [B] and [C] on the display unit 17 as shown in FIG. 14.

Also if the step S502 does not confirm the presence of the IC card in the first IC card slot, a step S516 confirms the presence of an IC card in the second IC card slot. If the IC card is absent, there is only available the function of English-English dictionary, so that the system proceeds to another control sequence, for example a state for awaiting the entry of an English word for English-English dictionary.

If the step S516 confirms the mounting of an IC card, a step S517 fetches the classification code B stored in advance in the IC card, and a step S518 confirms the presence of translation function. If such function is available, a step S519 stores the code B in the RAM 14, then a step S520 re-stores the code as the combination pattern M, and the sequence proceeds to a process starting from the step S510. Finally the combinations [A], [E] and [F] are displayed in an arbitrary order as shown in FIG. 14, and a step S514 awaits the entry for selection.

As explained in the foregoing, the present embodiment provides display of available translation modes as shown in FIG. 14 according to the mounted IC cards and allows the user to select a desired translation mode.

(Thirteenth Embodiment)

The "on" key in the 12th embodiment has the function of starting power supply only, but there may be added a function of menu display, indicating the operation modes available in the entire system, when said key is depressed after the start of power supply. Thus, when the first and second IC cards are replaced by those of other languages, it is rendered possible, even while one of the combinations is being executed, to confirm and execute the functions in the latest system state by depressing the "on" key thereby executing the control sequence shown in FIG. 15. Naturally any key other than the "on" key may be assigned for executing these functions.

(Fourteenth Embodiment)

The 12th embodiment describes a case in which the first and second IC cards respectively have translating functions, but it is also conceivable to incorporate the translation function (dictionary and search program) in the first IC card, to store an independent application function in the second IC card, and to execute the function of the second card in combination with the translation.

Figure 15A:
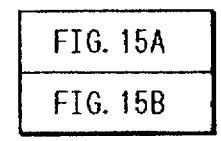
FIGS. 15, 15A–15B are flow charts of the control sequence in the first user interface system.
Figure 15:
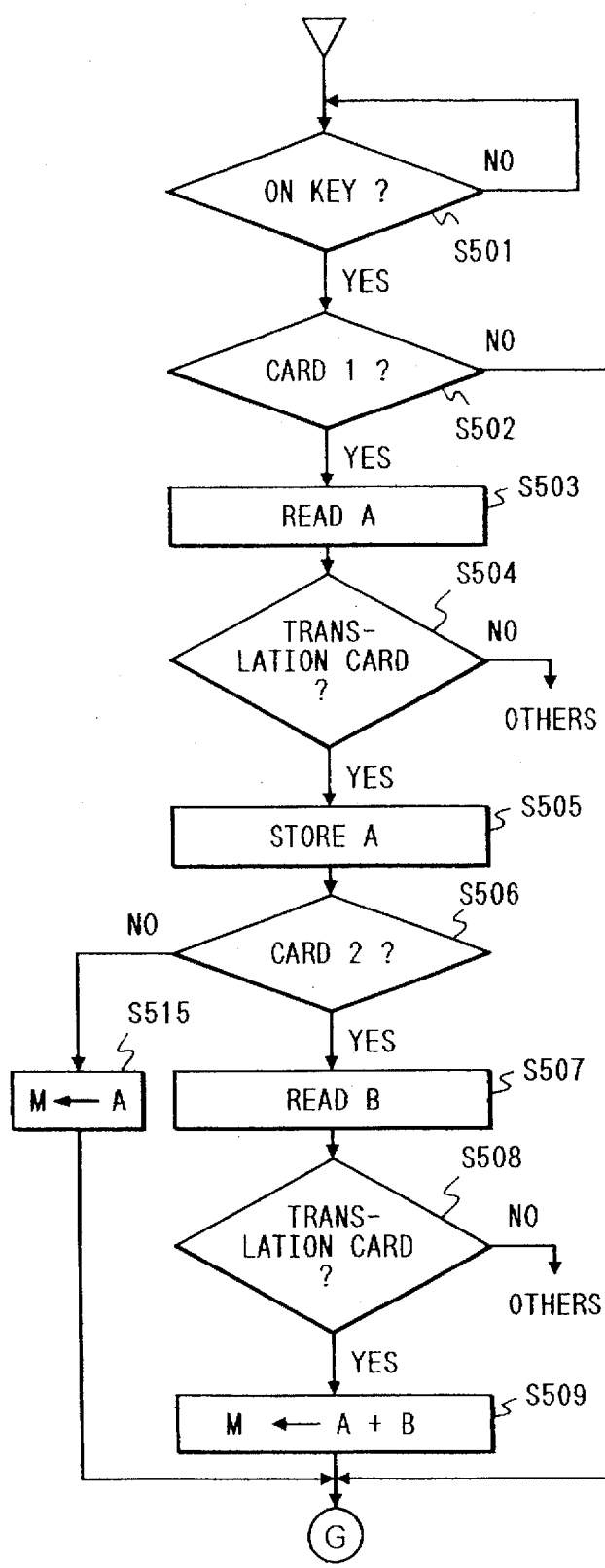
Figure 15B:
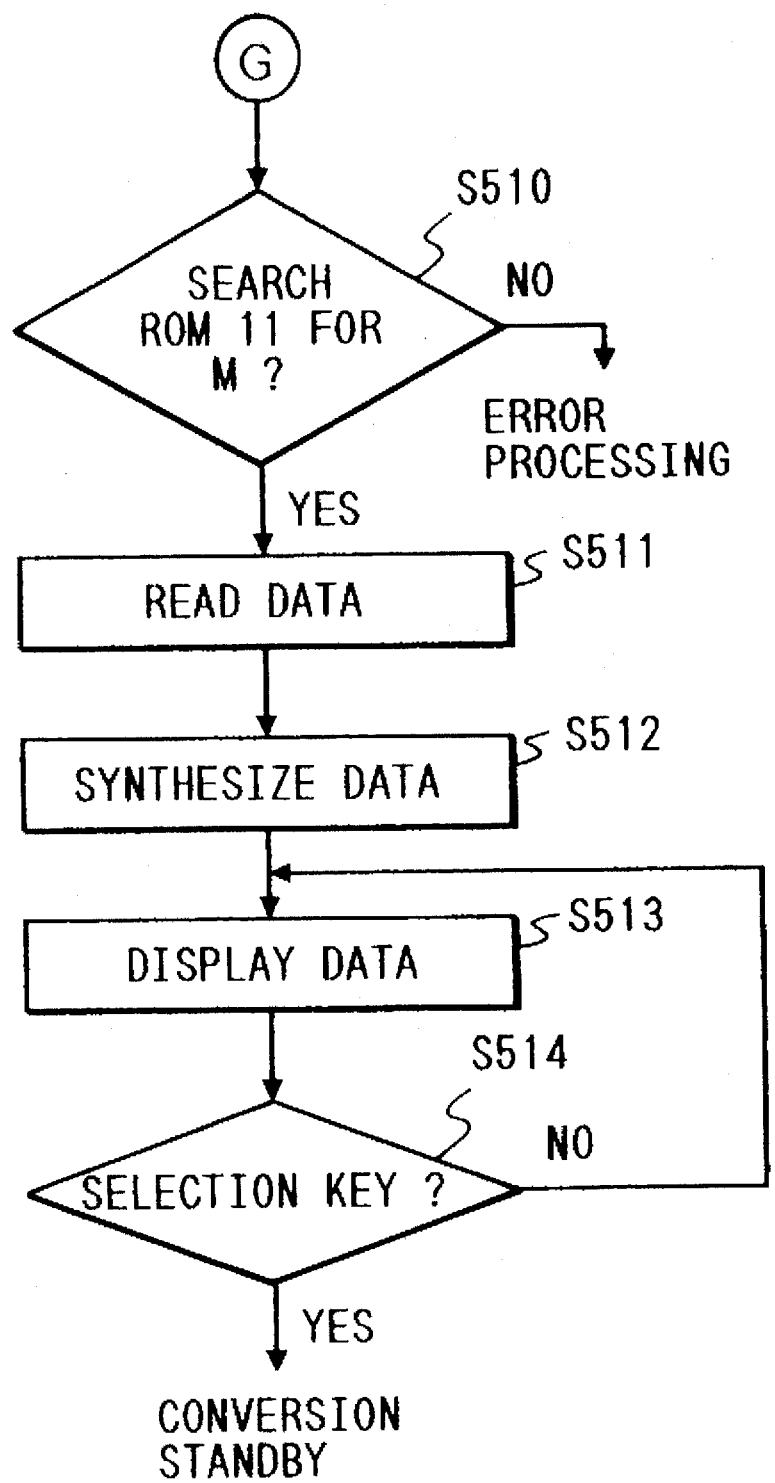
Figure 16:
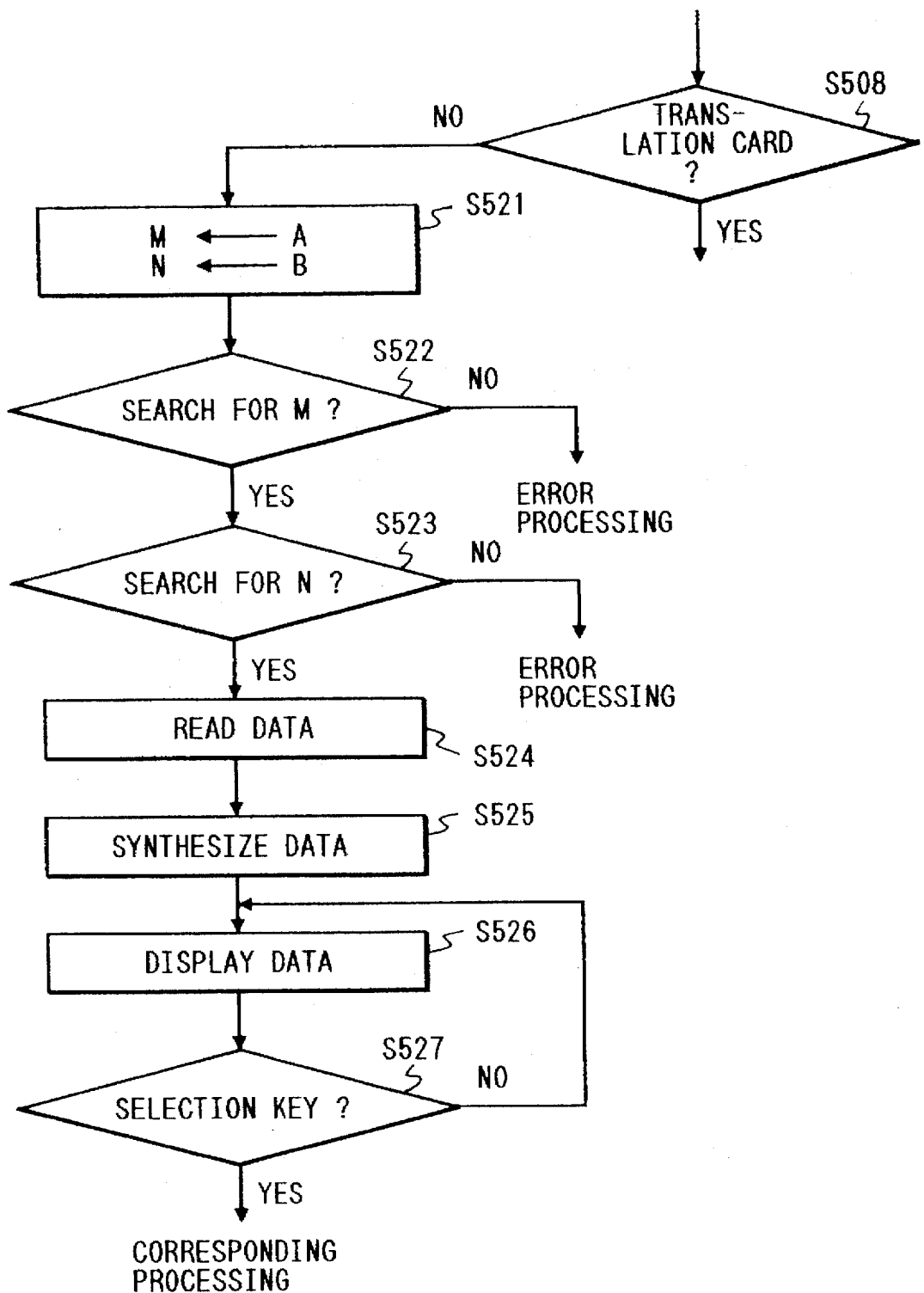
FIG. 16 is a flow chart of another control sequence in the first user interface system.

In such a case, the following display control can be realized by adding a sequence shown in FIG. 16 to the sequence shown in FIG. 15.

Thus, if the step S508 in FIG. 15 negates the translation function, based on the classification code B of the second IC card, the sequence proceeds to the flow shown in FIG. 16.

A step S521 re-stores the classification codes A and B respectively as the combination pattern M and a function pattern N; steps S522 and S523 search said patterns M, N; a step S524 reads the menu character display function stored in the ROM 11; a step S525 synthesizes the display information according to the display layout; and a step S526 executes the display on the display unit 17.

Figure 17:
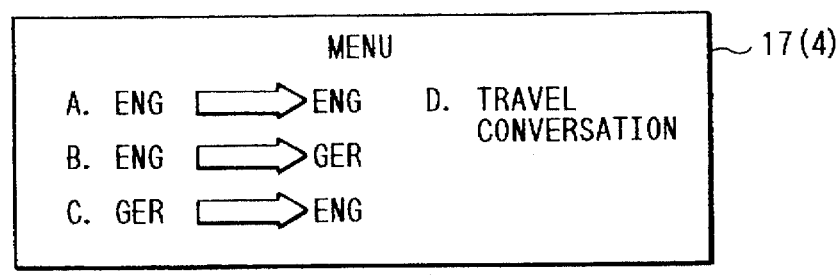
FIG. 17 is a schematic view showing another example of display in the first user interface system.

FIG. 17 shows an example of this display, in case an IC card containing travel conversations is mounted on the second IC card slot. As shown in FIG. 17, the menu items [A]–[C] show combinations of translation functions for the first IC cards, and an item [D] shows an application title "travel conversation".

Also if two application cards are mounted in the first and second IC card slots, thus negating the steps S504 and S508 in FIG. 15, there will be displayed the menu item [A] in FIG. 17 and two application titles so that the user can select three functions.

[Structure of User Interface: No. 2]

In the foregoing there has been explained the structure relating to the menu display and menu selection. In the following there will be given a detailed description on the structure for controlling the language of various messages to be displayed on the main body, corresponding to the selected language, when plural IC cards storing different language information are mounted on the main body.

(Fifteenth Embodiment)

Figure 18A:
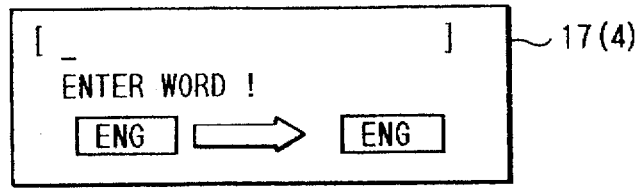
FIGS. 18A to 18C are schematic views showing examples of display in a second user interface system.

FIG. 18A shows a stage awaiting the input of a word when an item A (English-English dictionary mode) is selected in the menu display shown in FIG. 14. In this display, the message requesting an input to the operator is in English because the index word is to be entered in English.

Figure 18B:
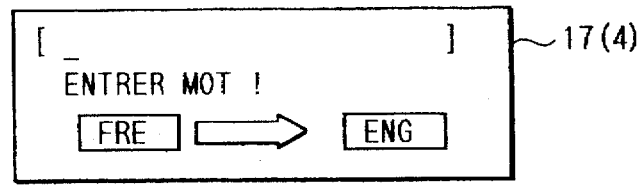

However, when the menu item F in FIG. 14 for French-English dictionary search is selected, it is preferable to automatically switch the message to the French language as shown in FIG. 18B.

In such case various messages such as an error message are also switched to French, and this mode is continued until the dictionary of another language is selected again on the menu display.

Since the selected language of the dictionary will be, in most cases, the mother tongue of the user, the message displays given in such language at the selection of the dictionary will significantly improve the operability of the apparatus.

In the following there will be explained the means for realizing the above-explained operations.

Figure 19:
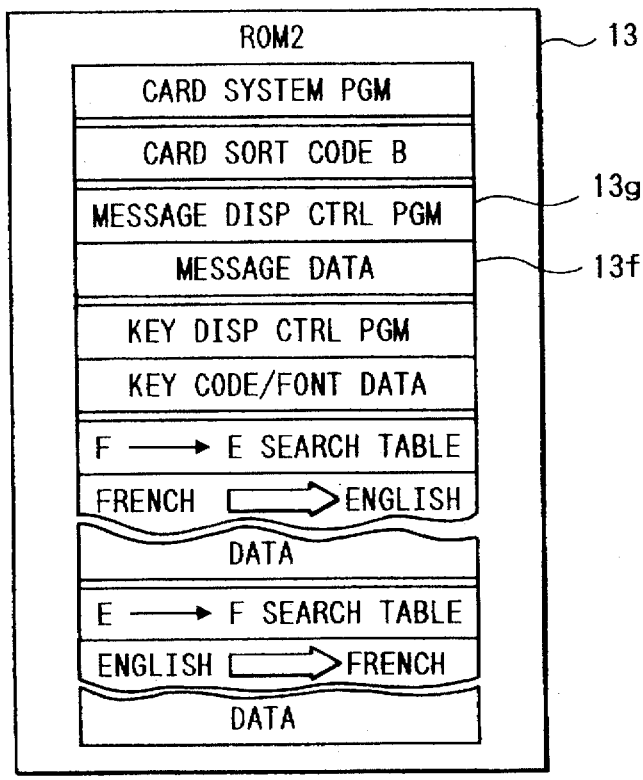
FIG. 19 is a view showing the ROM structure required for FIGS. 18A to 18C.

FIG. 19 shows the detailed internal structure of the ROM 13 stored in the IC card shown in FIG. 2.

A first area stores a program for executing a system control specific to the card, and said program is used for executing various predetermined processes when the CPU 10 shifts the control from the ROM 11 to the ROM 13.

A next area stores the card classification code B, for identifying the class of the card.

In a next area there are stored plural sets of message data 13f in the language of the IC card (French in this case) and a message display control program 13g for controlling said data. Said message data are provided respectively corresponding to the message data in English stored in the ROM 11.

In a next area there are stored codes for characters particular to French language, such as "á" and "è", other than ordinary alphabets, and corresponding display font data and a control program, which are to be explained later.

In the final dictionary data areas, there are respectively stored French-English and English-French dictionary data and corresponding search tables.

During the English-English translation mode shown in FIG. 18A, messages are displayed by a control program of the ROM 11 storing similar message data. However, when the French dictionary mode is selected as shown in FIG. 18B, the message display control is shifted to the ROM 13 by the confirmation of the card classification code B stored in the work area 14a of the RAM 14.

At the same time a flat indicating the selection of French language is set in the work area 14a and is retained when the menu display is restored or after the power supply is cut off. Thus, when the menu is displayed again at the re-start of power supply, the flag in the work area 14a is detected and the message display control is transferred to the IC card, so that the French message display mode can be maintained.

When the dictionary of another language is selected, the flag in the work area 14a is replaced to a flag indicating the other language, whereby the message displays are also switched to that language. Naturally the ROM of the IC card for such language should be constructed in the same manner as in the French dictionary card shown in FIG. 19.

As explained in the foregoing, by employing a similar memory structure in any language, the messages can be given in a language when an IC card of said language is mounted and the dictionary of said language is selected. Also the message displays in such language are continued even if the power supply is once cut off, unless another language is selected, and are very convenient for the user who uses the language as the mother tongue.

(Sixteenth Embodiment)

In the fifteenth embodiment the selection of the message language is achieved by the selection of the language of the dictionary, but there may also be constantly selected a message language regardless of the language of the dictionary.

Figure 18C:

More specifically, in the course of operation of the main body, in response to the depression of a switch key (not shown) in the keyboard, there is given a menu display indicating the languages available other than the currently used message language, identified from the classification codes stored in the work area, as shown in FIG. 18C, whereby the operator can arbitrarily select these languages.

In the fifteenth embodiment, the flag for identifying the message language is switched at the selection of the language of dictionary, but the present embodiment is easily realizable by switching said flag at the selection of the language after the depression of said switch key.

Figure 20:
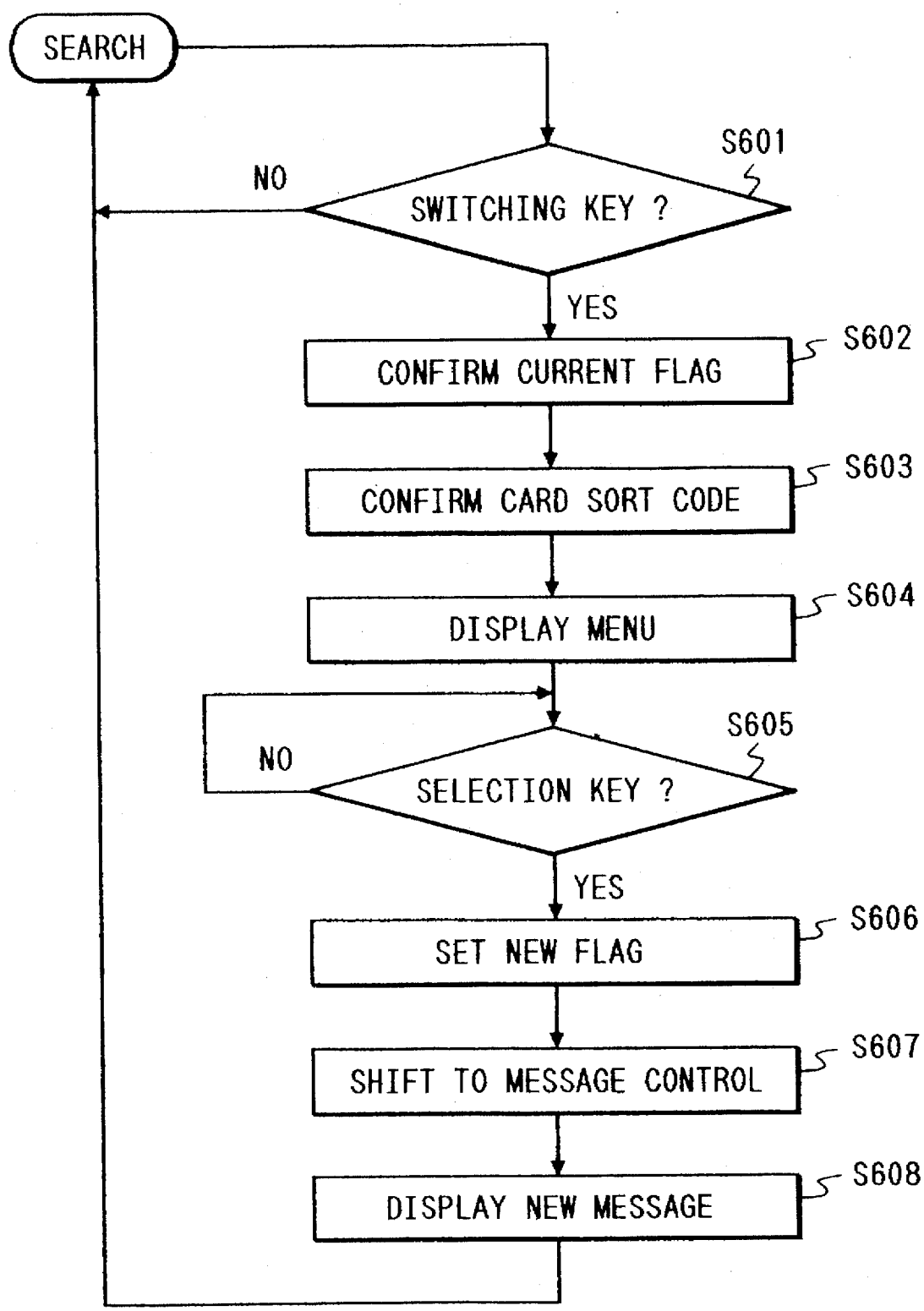
FIG. 20 is a flow chart of the control sequence of the second user interface system.

This display message switching control will be explained in the following with reference to a flow chart shown in FIG. 20.

In the course of execution of the search routine in the electronic dictionary function, a step S601 constantly monitors, in an interruption routine, the depression of the switch key. Upon detection of said depression, a step S602 confirms the flag indicating the current message language. In the present example it is assumed that English is selected as the current message language. Then a step S603 confirms the unused languages by the classification codes stored in the work area 14a, a step S604 provides a menu display (FIG. 18C) for selection of non-English languages (German or French), and a step S605 awaits the actuation of the selection key. When either language is selected, a step S605 sets a flag corresponding to the new message language in the RAM 14, then a step S607 shifts the message display control to a ROM containing the newly selected language, a step S608 executes the message display with the new language and the sequence proceeds to a next step in the search routine.

The message display is always given in the same language if the RAM 14 has a power backup when the power supply is cut off, unless the operator executes a switching operation. As the message displays are always given in a same language, they are convenient for the operator using that language as native language.

It is naturally possible also to combine the fifteenth and sixteenth embodiments. More specifically, the message display language is automatically switched at the switching of the dictionary language to said language, but is arbitrarily switchable during the use of said language.

Also if the operator can select either of the message display controls of the fifteenth and sixteenth embodiments, there is obtained a very convenient message display function for various operators.

[Structure of User Interface: No. 3]

In the following there will be explained a control, in response to the language of the mounted IC card or a language selected from plural languages, to automatically switch the functions of the input keys to the characters used in said selected language.

(Seventeenth Embodiment)

For example German language uses particular characters such as "β" and "ä". In the following there will be explained a process for adding input means for such characters.

Figure 21A:
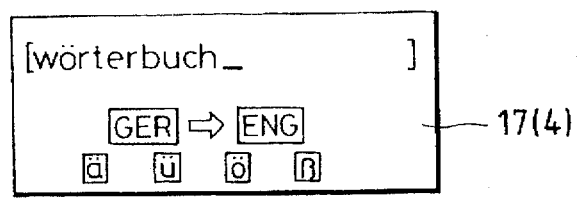
FIGS. 21A and 21B are views showing examples of display in a third user interface system.
Figure 21B:
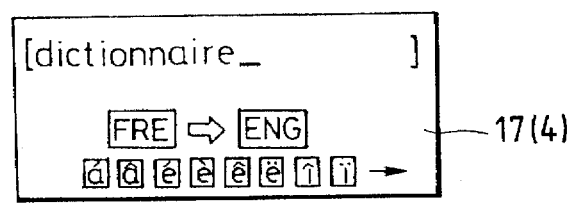

FIGS. 21A and 21B show examples of display in the present embodiment, and FIG. 21A shows a display for entry of the index word after a German IC card is mounted.

In the lower part of the display unit 17 there are displayed characters "ä", "ü", "ö" and "β" specific to German language, and such characters can be entered by pressing the positions of such displayed characters by means of a transparent keyboard 8 which is positioned on the display unit 17 and is to be explained later.

Such structure enables, in the input of German words, combinations of 26 alphabetic characters of the keyboard and 4 special characters in the display unit.

FIG. 21B shows a similar display for entering French words. In the lower part of the display unit 17 there are displayed certain characters specific to French language, which can be entered by pressing the transparent keyboard 8 provided on said display unit.

In the following there will be explained the structure of the transparent keyboard 8 on the display unit 17, with reference to FIGS. 22 and 23.

Figure 22:
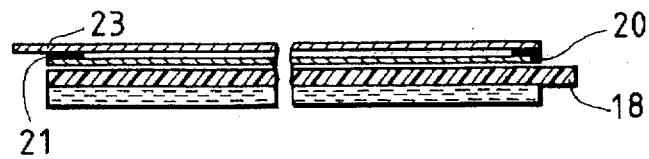
FIG. 22 is a cross sectional view of a transparent keyboard employed in the third user interface system.
Figure 23:
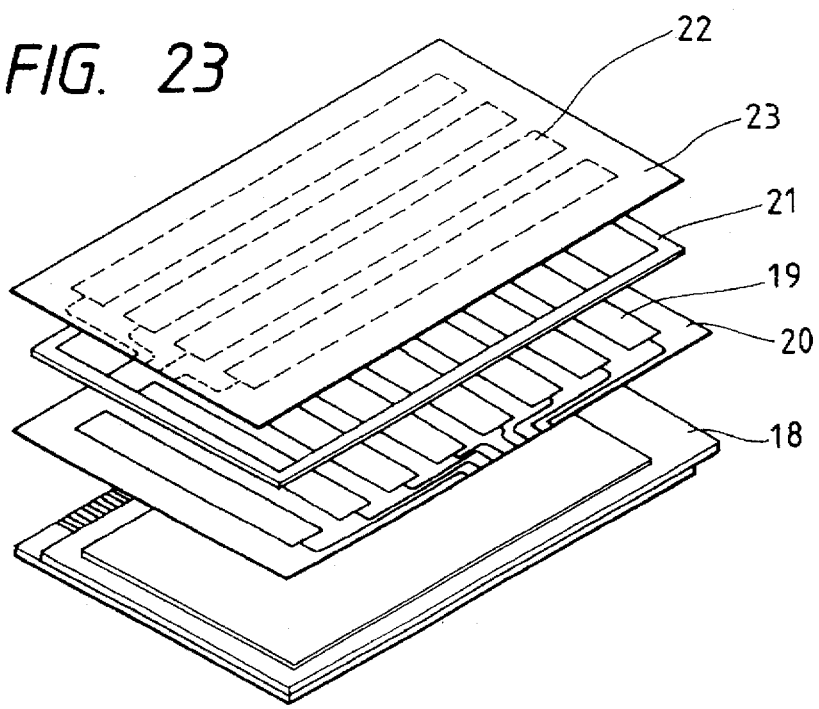
FIG. 23 is an exploded perspective view of the transparent keyboard.

FIG. 23 is an exploded perspective view of said transparent keyboard, and FIG. 22 is a cross-sectional view of an assembled keyboard.

Referring to FIGS. 22 and 23, on a liquid crystal display device 18 constituting the display unit 17, there is provided a lower flexible printed circuit board 20 bearing plural transparent electrodes 19 formed for example by evaporation on a transparent sheet such as a polyester film. On the board 20, there is laminated, across a spacer member 21 for maintaining a suitable gap, an upper flexible printed circuit board 23 similarly bearing plural transparent electrodes 22 on the lower face of a similar transparent sheet.

Four transparent electrodes 22 on the upper flexible printed circuit board 23 and eight transparent electrodes 19 on the lower board 20 are mutually orthogonally positioned and are mutually spaced by the spacer member 21. Thus, by pressing a predetermined position on the upper board 23 for example with a finger, one of the transparent electrodes 22 of the upper board 23 contacts with one of the transparent electrodes 19 of the lower board 20 to generate a key signal, inducing a key input process in the main body.

Now the control of the present embodiment will be explained with reference to a flow chart shown in FIG. 24. If a step S701 identifies the selection of a card in the course of operation of the main body or a step S702 identifies the start of power supply to the main body, a step S703 discriminates whether a card is mounted. If not, the sequence continues the function of the main body, or moves to another error process.

If the mounting of a card is confirmed, a step S704 fetches the classification code A of the card, and a step S705 stores it in the work area 14a of the RAM 14.

Then a step S706 reads key character display font data K stored in the ROM 11 as shown in FIG. 19, a step S707 reads input frame display information I, corresponding to the example of display shown in FIG. 12, from the ROM of the main body or of the card, a step S708 synthesizes the font K and the display information I into display information D, and a step S709 displays the information on the display unit.

If the alphabet keys and/or special characters on the transparent keyboard 8 on the display unit 17 are actuated in a step S710, the input processes for the index word are executed in succession.

As explained in the foregoing, there can be added key input means for entering special characters required for a particular language, corresponding to the function of the mounted IC card, so that the user can be prevented from cumbersome operations such as a shift key sequence, with no additional hardware for key input being required.

(Eighteenth Embodiment)

In the seventeenth embodiment there has been explained a case in which only one IC card is mounted. However, in case two IC cards storing different languages are mounted, a display shown in FIG. 14 is given by the aforementioned control sequence, and, in response to the input of selection for a language, there are displayed special characters to be used in said selected language, thereby forming a keyboard for said language.

Figure 24:
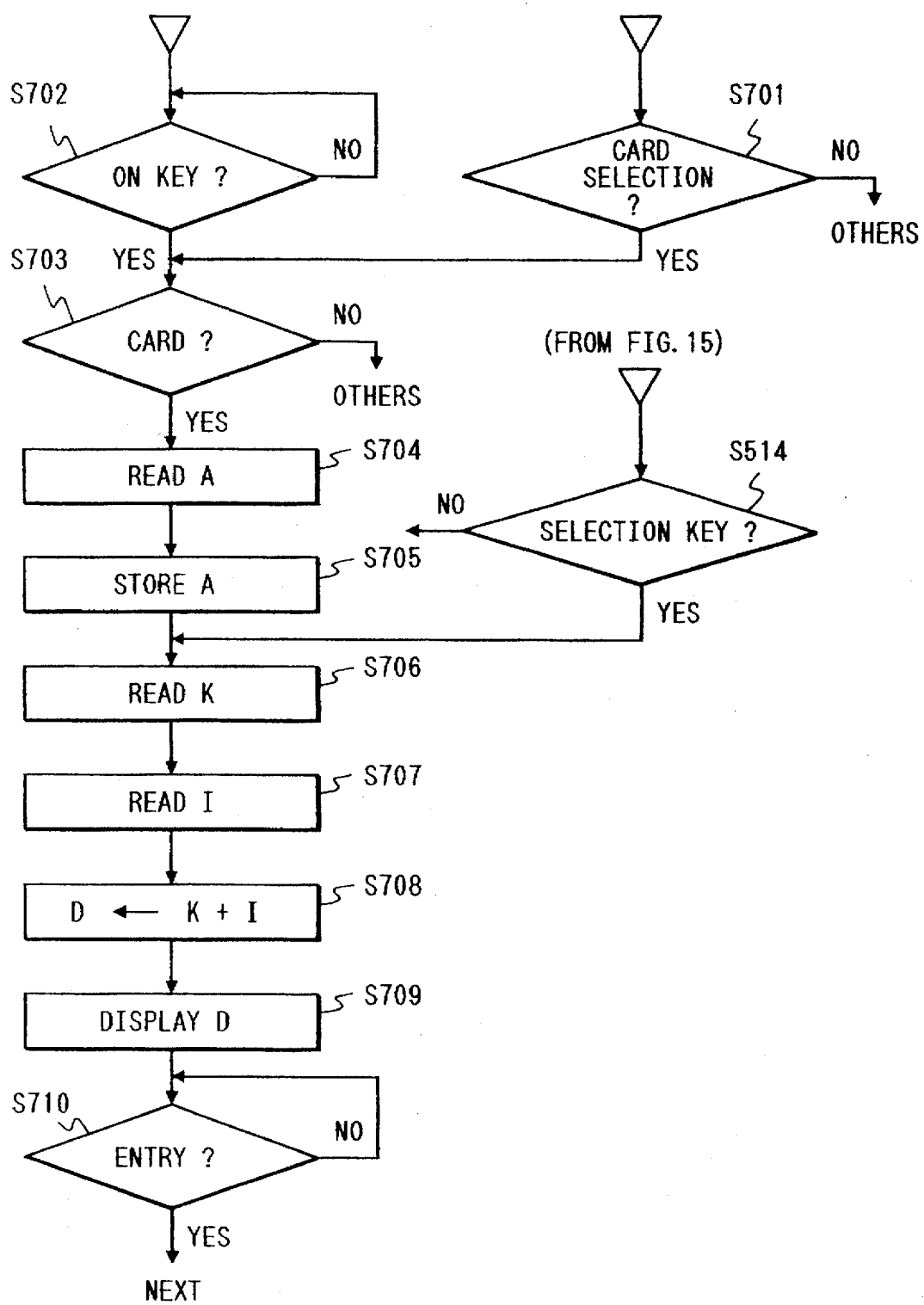
FIG. 24 is a flow chart of the control sequence in the third user interface system.

More specifically, when a selection key is depressed in a step S514 in FIG. 15, a step S706 in FIG. 24 reads the character font data K stored in the card containing the selected language, then the aforementioned flow is executed and a step S710 awaits the input of the index word.

The seventeenth or eighteenth embodiment explained above prevents an increase in the dimension of the main body or a complication in the key input operation resulting from addition of exclusive keys for special characters in the keyboard or addition of plural functions to each key, and selectively displays the special characters only used in the selected language, thereby enabling speedy and exact character input operations.

[Effect of Embodiments]

In the following, summarized are the principal advantages attainable with the foregoing embodiments in an electronic apparatus capable of accepting plural IC cards constructed as external memory devices and of receiving first language information and releasing second language information corresponding to said first language information:

(1) The translating system explained in [Basic structure of translation between different languages] and in [Details of translation between different languages] provides following advantages.

In storing plural different languages in a memory, a common language is combined with each of the plural languages, and the common language is utilized as an intermediate language in effecting the conversion among the plural languages. In this manner it is rendered possible to prevent the expansion of memory capacity and the resulting increase in cost, in case data are constructed for conversion for every combination among plural languages. Also there can be avoided the cumbersome operation of preparing a dictionary for each combination of the languages and the cumbersome and confusing operation of exchanging the dictionary for each conversion.

Also in case of adding a new language, conversions with all the existing languages are assured by only making correspondence with the common intermediate language, so that the functional expansivity and the freedom of the system can be improved.

Also in the translation between different languages, an improved accuracy can be achieved by applying a conversion/coincidence process in each conversion step.

In addition the above-mentioned structures naturally render the results of translation between each language and the intermediate language, so that translations among many languages are possible with a limited number of dictionaries.

(2) The interface system explained in [Structure of user interface: No. 1] provides the following advantages.

In mounting IC cards respectively containing plural languages on the main body of the apparatus in arbitrary combinations, the available combinations of conversions among plural languages are automatically displayed on the main body for selection by the user, so that the language converting functions available in the current main body-card combination can be easily confirmed and selected.

(3) The interface system explained in [Structure of user interface: No.2] provides the following advantages.

In mounting IC cards respectively containing plural languages on the main body of the apparatus in arbitrary combinations, the message displays can be given in one of plural languages, selectable automatically or manually by the operator. Thus various messages given in the course of operation become more easily understandable for the operator using such language as the native language. Consequently a significant improvement in the operation efficiency and prevention of errors in operation can be achieved.

(3) The interface system explained in [Structure of user interface: No. 3] provides the following advangages.

In mounting IC cards respectively containing plural languages on the main body of the apparatus in arbitrary combinations and in selecting an arbitrary one from plural languages, special characters used in said selected languages are displayed on a display unit and are rendered available for input by a keyboard provided on said display unit. Consequently the keyboard always contains only the characters necessary in the selected language, thereby ensuring accurate and speedy input operations. Also it is not necessary to provide the keyboard with unnecessary keys, so that the main body can be made compact and reduced in cost.

Furthermore the present invention provides following advantages:

(A) In an electronic apparatus for processing language information of plural languages, there are provided an external memory device containing language information of a particular language and detachably mountable on the main body of the apparatus, means for displaying at least character information, and means, provided on the display face of said display means, for selecting a desired one of the character information displayed on said display means, wherein, when said external memory device is mounted on said main body, the character information specific to the language of the language information stored in said external memory device is displayed on said display means and the character information selected by said selecting means from thus displayed character information is entered as an input into the apparatus. It is therefore rendered possible to enter, by means of the selection means provided on the display means, the character information specific to the language of the language information stored in the detachable external memory device. Consequently fixed input means for such specific characters is unnecessary, and there can be obtained an electronic apparatus which is compact, light in weight, inexpensive and excellent in expansivity.

(B) In an electronic apparatus for processing language information of plural languages, there are provided an external memory device containing language information of a particular language and detachably mountable on the main body of the apparatus, and means for displaying language information, wherein, when said external memory device is mounted, said display means provides message displays, at predetermined timings of processing, in the language corresponding to the language information stored in said external memory device. Consequently the message displays are automatically given in the language corresponding to the language information stored in the mounted external memory device. Thus the message displays can be given to the user in a more appropriate manner, thereby improving the operability and the operation efficiency.

(C) In an electronic apparatus for processing language information of plural languages, there are provided an external memory device containing language information of a particular language and control information required for language information processing and detachably mountable on the main body of the apparatus, and display means for displaying language information, wherein, when said external memory device is mounted, said display means is adapted to display, at a predetermined timing, the language information processing function enabled by the control information stored in said external memory device. Thus the language processing functions activated by the detachable external memory means can be clearly known to the operator through the display means, whereby the operability and the operation efficiency can be improved.

What is claimed is:

1. An electronic apparatus using an external memory device containing language information of a predetermined language and detachably mountable on a main body of said apparatus, said apparatus comprising:

display means for displaying characters specific to the predetermined language stored in the external memory device;

display control means for controlling said display means to display the characters specific to the predetermined language stored in the external memory device when the external memory device is mounted on said main body of said apparatus;

selection means for selecting a desired character from the characters displayed on said display means;

key input means for inputting at least one character; and processing means for processing a word comprising a character selected by said selection means and at least one character input by said key input means.

2. An apparatus according to claim 1, wherein said main body comprises:

mounting units for detachably mounting a plurality of the external memory devices; and means for designating a desired one of the predetermined languages stored in the mounted plural external memory devices, wherein the character specific to the language designated by said designating means is displayed by said display means, and, when a desired one is selected by said selection means from the displayed characters, the selected character is entered as information by said selection means.

3. An electronic apparatus using an external memory device containing language information of a predetermined language and messages expressed in a language corresponding to the language information and detachably mountable on a main body of said apparatus, said apparatus comprising:

display means for displaying language information; and control means for controlling said display means to display messages at the start of the supplying of power to said apparatus in a language corresponding to the predetermined language information stored in the external memory device when the external memory device is mounted on said main body of said apparatus.

4. An electronic apparatus using an external memory device containing language information of a predetermined language and control information required for a language information processing function, and detachably mountable on a main body of said apparatus, said apparatus comprising:

display means for displaying language information; and means for, when the external memory device is mounted on said apparatus, executing a language information processing function activated by the control information stored in the external memory device, at a start of the supplying of power to said apparatus, and for causing said display means to display information representing the function.

5. An apparatus according to claim 4, wherein the main body of the apparatus comprises mounting units for detachably mounting a plurality of said external memory devices.

6. An electronic apparatus using an external memory device containing language information of a predetermined language and control information required for a language information processing function, and detachably mountable on a main body of said apparatus, said apparatus comprising:

display means for displaying language information;

processing means for, when the external memory device is mounted on said main body of said apparatus, executing a language information processing function activated by the control information stored in the external memory device;

instruction means for instructing said display means to display a menu of language information processing functions;

discriminating means for discriminating the language information stored in the external memory device, in response to an instruction from said instruction means; and display control means for controlling said display means to display a menu of language information processing functions executable at this time based on the discriminating by said discrimination means.

7. An apparatus according to claim 6, wherein the main body of the apparatus comprises mounting units for detachably mounting a plurality of said external memory devices.

8. An electronic apparatus comprising:

mounting means for detachably mounting a plurality of external memory devices, each external memory device storing respective language information of a predetermined language;

display means for displaying characters specific to each predetermined language stored in the plurality of external memory devices;

designation means for designating a desired one of the predetermined languages stored in the external memory devices mounted on said mounting means, display control means controlling said display means to display characters specific to the language designated by said designation means when the external memory devices are mounted on said mounting means;

selection means for selecting a desired character from the characters displayed by said display means;

key input means for inputting at least one character; and processing means for processing a word comprising a character selected by said selection means and at least one character input by said key input means.

9. An electronic apparatus comprising:

mounting means for detachably mounting an external memory device which stores language information;

display means for displaying language information;

discriminating means for discriminating the language information stored in the external memory device at a start of the supplying of power to said apparatus when the external memory device is mounted on said mounting means; and control means for causing said display means to effect message displays at the start of the supplying of power to said apparatus in a language corresponding to the predetermined language information discriminated to be stored in the external memory device.

10. An apparatus according to claim 9, wherein said mounting means comprises plural mounting units for respectively mounting plural external memory devices.

11. An electronic apparatus comprising:

mounting means for detachably mounting plural external memory devices;

display means for displaying language information; and means for executing a language information processing function activated by control information stored in the external memory device mounted on said mounting means, at a start of the supplying of power to said apparatus, and for causing said display means to display information representing the function.

12. An electronic apparatus comprising:

mounting means for detachably mounting plural external memory devices, each external memory device storing respective language information of a predetermined language and control information required for a language information processing function;

display means for displaying language information;

processing means for, when the external memory devices are mounted on said mounting means, executing a language information processing function activated by the control information stored in one of the external memory devices;

instruction means for instructing said display means to display a menu of language information processing functions;

discriminating means for discriminating the language information stored in the plural external memory devices, in response to an instruction from said instruction means; and display control means for controlling said display means to display the menu of language information processing functions executable at this time based on the discriminating by said discrimination means.

* * * * *

UNITED STATES PATENT AND TRADEMARK OFFICE
CERTIFICATE OF CORRECTION

PATENT NO. : 5,742,505  Page 1 of 2
DATED : April 21, 1998
INVENTOR(S) : Fushimoto et al.

It is certified that error appears in the above-indentified patent and that said Letters Patent is hereby corrected as shown below:

COVER PAGE

REFERENCES CITED

U.S. PATENT DOCUMENTS

Insert:

--4,493,050   01/1985   Hashimoto et al.--.

FOREIGN PATENT DOCUMENTS

Insert:

--2121574       12/1983    Great Britain
  0217174       04/1987    Europe--.

After "FOREIGN PATENT DOCUMENTS" insert:

--OTHER PUBLICATIONS

Patent Abstracts of Japan, Vol. 6, No. 27, February 17, 1982, English Abstract of Japanese Patent No. 56-147267.

Patent Abstracts of Japan, Vol. 12, No. 415, November 4, 1988, English Abstract of Japanese Patent No. 63-153690.--.

Column 1

Line 28, "appratus," should read --apparatus--.

UNITED STATES PATENT AND TRADEMARK OFFICE
CERTIFICATE OF CORRECTION

PATENT NO. : 5,742,505
DATED : April 21, 1998
INVENTOR(S) : Fushimoto et al.

It is certified that error appears in the above-indentified patent and that said Letters Patent is hereby corrected as shown below:

COLUMN 2

Line 6, "convetionally" should read --conventionally--.

Column 6

Line 47, "desclosed" should read --disclosed--.

Column 8

Line 49, "these" should read --those--.

Column 9

Line 23, "combination," should read --combinations,--.

Column 10

Line 13, "a n" should read --an--.

Signed and Sealed this

Seventeenth Day of August, 1999

Attest:

Q. TODD DICKINSON

*Attesting Officer*   Acting Commissioner of Patents and Trademarks